United States Patent
Park et al.

(10) Patent No.: US 12,495,442 B2
(45) Date of Patent: Dec. 9, 2025

(54) METHOD AND DEVICE FOR TRANSMITTING UPLINK DATA IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Jinyoung Oh, Gyeonggi-do (KR); Jonghyun Bang, Gyeonggi-do (KR); Hyunseok Ryu, Gyeonggi-do (KR); Seunghoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 505 days.

(21) Appl. No.: 17/911,072

(22) PCT Filed: Mar. 22, 2021

(86) PCT No.: PCT/KR2021/003529
§ 371 (c)(1),
(2) Date: Sep. 12, 2022

(87) PCT Pub. No.: WO2021/206315
PCT Pub. Date: Oct. 14, 2021

(65) Prior Publication Data
US 2023/0164829 A1     May 25, 2023

(30) Foreign Application Priority Data
Apr. 9, 2020 (KR) .................. 10-2020-0043496

(51) Int. Cl.
H04W 74/04 (2009.01)
H04W 74/00 (2009.01)
(Continued)

(52) U.S. Cl.
CPC ......... *H04W 74/04* (2013.01); *H04W 74/006* (2013.01); *H04W 74/0816* (2013.01); *H04W 74/0875* (2013.01)

(58) Field of Classification Search
CPC ............... H04W 74/04; H04W 74/006; H04W 74/0816; H04W 74/0875; H04W 74/0808; H04W 74/002; H04L 5/00
See application file for complete search history.

(56) References Cited

U.S. PATENT DOCUMENTS

| | | | |
|---|---|---|---|
| 9,301,286 B2 | 3/2016 | Chung et al. | |
| 9,986,511 B2 | 5/2018 | Yang et al. | |

(Continued)

FOREIGN PATENT DOCUMENTS

| | | |
|---|---|---|
| KR | 10-2012-0049867 | 5/2012 |
| KR | 10-2020-0127681 | 11/2020 |

(Continued)

OTHER PUBLICATIONS

PCT/ISA/210 Search Report issued on PCT/KR2021/003529, Jun. 24, 2021 pp. 5.

(Continued)

*Primary Examiner* — Noel R Beharry
(74) *Attorney, Agent, or Firm* — The Farrell Law Firm, P.C.

(57) ABSTRACT

The present disclosure relates to a communication technique for converging IoT technology with a 5G communication system for supporting a higher data transmission rate beyond a 4G system, and a system therefor. The present disclosure may be applied to an intelligent service (for example, a smart home, a smart building, a smart city, a smart car or connected car, health care, digital education, retail business, a security and safety-related service, etc.) on the basis of 5G communication technology and IoT-related technology. The (Continued)

present disclosure discloses a method and device for transmitting uplink data.

14 Claims, 16 Drawing Sheets

(51) Int. Cl.
*H04W 74/08* (2024.01)
*H04W 74/0816* (2024.01)

(56) References Cited

U.S. PATENT DOCUMENTS

| | | | |
|---|---|---|---|
| 11,303,391 | B2 | 4/2022 | Choi et al. |
| 2020/0037256 | A1* | 1/2020 | Wang .................... H04L 5/0094 |
| 2020/0296677 | A1* | 9/2020 | Hosseini ............ H04W 72/0453 |
| 2021/0144799 | A1* | 5/2021 | Babaei .................. H04W 72/23 |
| 2021/0258981 | A1* | 8/2021 | Hosseini ............. H04W 72/566 |

FOREIGN PATENT DOCUMENTS

| | | | |
|---|---|---|---|
| WO | WO 2015/111931 | 7/2015 | |
| WO | WO-2017126935 A1 * | 7/2017 | ........... H04L 5/0053 |

OTHER PUBLICATIONS

PCT/ISA/237 Written Opinion issued on PCT/KR2021/003529, Jun. 24, 2021, pp. 5.
Vivo, "Summary of email discussion [100e-NR-L1enh_URLLC-Inter_UE-03]", R1-2001292, 3GPP TSG RAN WG1 #100, e-Meeting, Feb. 29, 2020, pp. 10.
Intel Corporation et al., "Miscellaneous Corrections to UE capability parameters", R2-2002297, 3 GPP TSG RAN WG2#109-e, Electronic meeting, Mar. 11, 2020, pp. 45.
3GPP; TSG RAN; NR; UE radio access capabilities (Release 16), 3GPP TS 38.306 V16.0.0, Apr. 8, 2020, pp. 66.
Qualcomm Incorporated, "Uplink Inter-UE Tx Multiplexing and Prioritization", R1-1912963, 3GPP TSG-RAN WG1 #99, Nov. 18-22, 2019, 6 pages.
Korean Office Action dated May 22, 2025 issued in counterpart application No. 10-2020-0043496, 10 pages.

* cited by examiner

METHOD AND DEVICE FOR TRANSMITTING UPLINK DATA IN WIRELESS COMMUNICATION SYSTEM

PRIORITY

This application is a National Phase Entry of PCT International Application No. PCT/KR2021/003529, which was filed on Mar. 22, 2021, and claims priority to Korean Patent Application No. 10-2020-0043496, which was filed on Apr. 9, 2020, the entire content of each of which is incorporated herein by reference.

TECHNICAL FIELD

The disclosure relates to a wireless communication system, and more particularly, to a method and device for transmitting an uplink signal of a terminal in a wireless communication system.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. A 5G communication system defined by 3GPP is referred to as a new radio (NR) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system and are applied to the NR system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (COMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

Nowadays, with the development of wireless communication systems, various improvements for uplink transmission have been made, and the demand for improvement in a process of determining a time resource area for uplink is increasing.

DISCLOSURE OF INVENTION

Technical Problem

The disclosure relates to a method and device for transmitting an uplink signal in a wireless communication system based on the above-described discussion.

Solution to Problem

In order to solve the above problems, a method of processing a control signal in a wireless communication system includes receiving a first control signal transmitted from a base station; processing the received first control signal; and transmitting a second control signal generated based on the processing to the base station.

Advantageous Effects of Invention

In a device and method according to various embodiments of the disclosure, a terminal can increase an uplink signal transmission performance.

Effects that may be obtained from the disclosure are not limited to the above-mentioned effects, and other effects not mentioned will be clearly understood by those of ordinary skill in the art to which the disclosure belongs from the following description.

MODE FOR THE INVENTION

Figure 1:
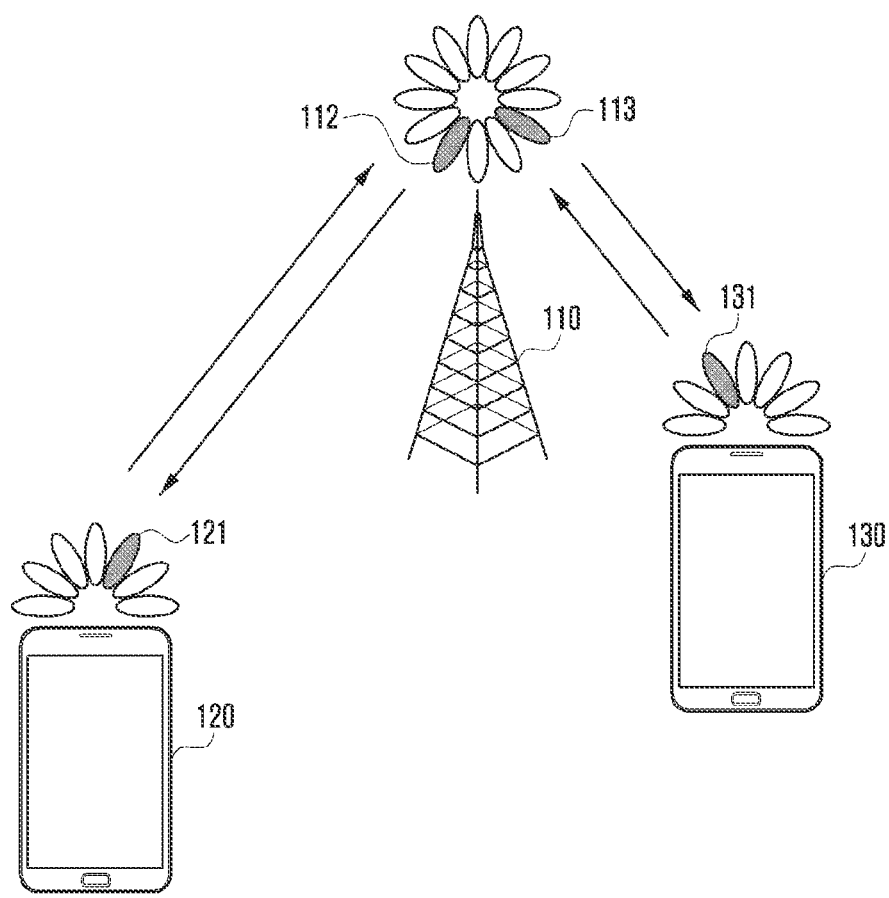
FIG. 1 illustrates a wireless communication system according to various embodiments of the disclosure.

Hereinafter, embodiments of the disclosure will be described in detail with the accompanying drawings. Further, in describing the disclosure, when it is determined that a detailed description of a related known function or configuration may unnecessarily obscure the subject matter of the disclosure, a detailed description thereof will be omitted. Terms described below are terms defined in consideration of functions in the disclosure, which may vary according to intentions or customs of users and operators. Therefore, the definition should be made based on the content throughout this specification.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

Hereinafter, embodiments of the disclosure will be described in detail with reference to the attached drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '-unit' may include one or more processors. A wireless communication system has developed from providing voice-oriented services in the early days to a broadband wireless communication system that provides high-speed and high-quality packet data services together with communication standards such as high speed packet access (HSPA), long term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. Further, as a fifth-generation wireless communication system, communication standards of 5G or new radio (NR) are being developed.

In case of a 5G communication system, various technologies such as technology (e.g., grant-free uplink transmission) capable of transmitting an uplink signal without uplink scheduling information or retransmission in a code block group (CBG) unit in order to provide various services and support a high data rate will be introduced. Therefore, in case of performing 5G communication through an unlicensed band, a more efficient channel access procedure in consideration of various variables is required.

As described above, in a wireless communication system including 5G, at least one service of an enhanced mobile broadband (eMBB), massive machine type communications (mMTC), or ultra-reliable and low-latency communications (URLLC) may be provided to the terminal. The above-described services may be provided to the same terminal during the same time period. In the embodiment, the eMBB may be a service that aims for high-speed transmission of high-capacity data, the mMTC may be a service that aims for minimizing terminal power and access of multiple terminals, and the URLLC may be a service that aims for high reliability and low latency, but is not limited thereto. The three services may be major scenarios in an LTE system or a system such as 5G/NR (new radio, next radio) after LTE, but are not limited to the above examples. Further, services of the above-described 5G system are exemplary, and possible services of the 5G system are not limited to the above-described examples. Further, a system providing an URLLC service may be referred to as an URLLC system, and a system providing an eMBB service may be referred to as an eMBB system. Further, terms of a service and a system may be used interchangeably.

Hereinafter, the base station may include at least one of an eNode B, a node B, a base station (BS), a wireless access unit, a base station controller, or a node on a network, as an entity for performing resource allocation for the terminal. The terminal may include at least one of a user equipment (UE), a mobile station (MS), a cellular phone, a smartphone phone, a computer, or a multimedia system capable of performing a communication function. In the disclosure, a downlink (DL) refers to a wireless transmission path of a signal transmitted by the base station to the terminal, and an uplink (UL) refers to a wireless transmission path of a signal transmitted by the terminal to the base station. Further, hereinafter, an embodiment of the disclosure is described using an LTE or LTE-A system as an example, and terms of a physical channel and signal in a conventional LTE or LTE-A system may be used for describing methods and devices proposed in the disclosure. Embodiments of the disclosure may also be applied to other communication systems having a technical background or channel form similar to a mobile communication system described in the disclosure. For example, 5G mobile communication technology (5G, new radio (NR)) developed after LTE-A may be included therein. Further, embodiments of the disclosure may be applied to other communication systems through some modifications within a range that does not significantly deviate from the scope of the disclosure as determined by a person having skilled technical knowledge.

As a representative example of a broadband wireless communication system, a 5G system or a new radio (NR) system employs an orthogonal frequency division multiplexing (OFDM) scheme in a downlink (DL), and employs both OFDM and a single carrier frequency division multiple access (SC-FDMA) or DFT spread OFDM (DFT-s-OFDM) scheme in an uplink (UL). In a multiple access method, each user's data or control information may be distinguished by allocating and operating time-frequency resources in which each user's data or control information is transmitted so that they do not overlap each other, that is, orthogonality is established.

The NR system employs a hybrid automatic repeat request (HARQ) scheme that retransmits the corresponding data at a physical layer in case that a decoding failure occurs in initial transmission. The HARQ scheme is that in case that a receiver fails to accurately decrypt (decode) data, the receiver transmits, to a transmitter, information (e.g., negative acknowledgement (NACK)) notifying the transmitter of the decoding failure to enable the transmitter to retransmit the data at the physical layer. The receiver may couple the data retransmitted by the transmitter with data that has previously failed to decode, thereby increasing a data reception performance. Further, in the HARQ scheme, in case that the receiver accurately decodes data, the receiver transmits information (e.g., acknowledgment (ACK)) notifying the transmitter of decoding success to enable the transmitter to transmit new data.

Terms referring to signals, terms referring to channels, terms referring to control information, terms referring to network entities, and terms referring to components of devices used in the following description are exemplified for convenience of description. Accordingly, the disclosure is not limited to the terms described below, and other terms having equivalent technical meanings may be used.

Further, the disclosure describes various embodiments using terms used in some communication specifications (e.g., third generation partnership project (3GPP)), but this is only an example for description. Various embodiments of the disclosure may be easily modified and applied in other communication systems.

Various embodiments of the disclosure are described based on an NR system, but the contents of the disclosure are not limited to the NR system, but may be applied to various wireless communication systems such as LTE, LTE-A, LTE-A-Pro, and 5G. Further, although the contents of the disclosure describe a system and device for transmitting and receiving signals using an unlicensed band, the contents of the disclosure will also be applicable to a system operating in a licensed band.

Hereinafter, in the disclosure, higher layer signaling or a higher signal may be a signal transmission method transmitted from the base station to the base station using a downlink data channel of a physical layer or from the terminal to the base station using an uplink data channel of a physical layer, and include at least one of signal transmission methods transmitted through radio resource control (RRC) signaling, packet data convergence protocol (PDCP)

signaling, or a media access control (MAC) control element (CE). Further, the higher layer signaling or higher signal may include system information, for example, a system information block (SIB), commonly transmitted to a plurality of terminals, and also include information other than a master information block (MIB) among information transmitted through a physical broadcast channel (PBCH). In this case, the MIB may also be included in the higher signal.

FIG. 1 illustrates a wireless communication system according to various embodiments of the disclosure. FIG. 1 illustrates a base station 110, a UE 120, and a UE 130 as part of nodes using a wireless channel in a wireless communication system. FIG. 1 illustrates only one base station, but other base stations that are the same as or similar to the base station 110 may further be included. The base station 110 is a network infrastructure that provides wireless access to the UEs 120 and 130. The base station 110 has coverage defined as a predetermined geographic area based on a distance that may transmit a signal. The base station 110 may be referred to as an 'access point' (AP), 'eNodeB (eNB)', 'gNodeB (gNB)', '5G generation node', 'wireless point', 'transmission/reception point' (TRP), or other terms having an equivalent technical meaning in addition to the base station.

Each of the UE 120 and the UE 130 is a device used by a user, and perform communication with the base station 110 through a wireless channel. In some cases, at least one of the UE 120 or the UE 130 may be operated without involvement of the user. That is, at least one of the UE 120 or the UE 130 is a device for performing machine type communication (MTC), which may not be carried by the user. Each of the UE 120 and the UE 130 may be referred to as a 'user equipment (UE)', 'mobile station', 'subscriber station', 'remote UE', 'wireless UE', 'user device', or other terms having an equivalent technical meaning other than the UE.

A wireless communication environment 100 may include wireless communication in an unlicensed band. The base station 110, the UE 120, and the UE 130 may transmit and receive wireless signals in an unlicensed band (e.g., 5 to 7 GHz, 64 to 71 GHz). In the unlicensed band, a communication system (e.g., wireless local area network (WLAN) different from a cellular communication system may coexist. In order to ensure fairness between two communication systems, that is, to avoid a situation in which a channel is used exclusively by one system, the base station 110, the UE 120, and the UE 130 may perform a channel access procedure for an unlicensed band. As an example of a channel access procedure for an unlicensed band, the base station 110, the UE 120, and the UE 130 may perform listen before talk (LBT).

The base station 110, the UE 120, and the UE 130 may transmit and receive wireless signals in a millimeter wave (mmWave) band (e.g., 28 GHz, 30 GHz, 38 GHz, and 60 GHz). In this case, in order to improve a channel gain, the base station 110, the UE 120, and the UE 130 may perform beamforming. Here, beamforming may include transmission beamforming and reception beamforming. That is, the base station 110, the UE 120, and the UE 130 may give directivity to a transmitting signal or a receiving signal. To this end, the base station 110, the UE 120, and the UE 130 may select serving beams through a beam search or beam management procedure. After the serving beams are selected, the communication may be performed through a resource in a quasi co-positioned (QCL) relationship with the resource that has transmitted the serving beams.

Figure 2:
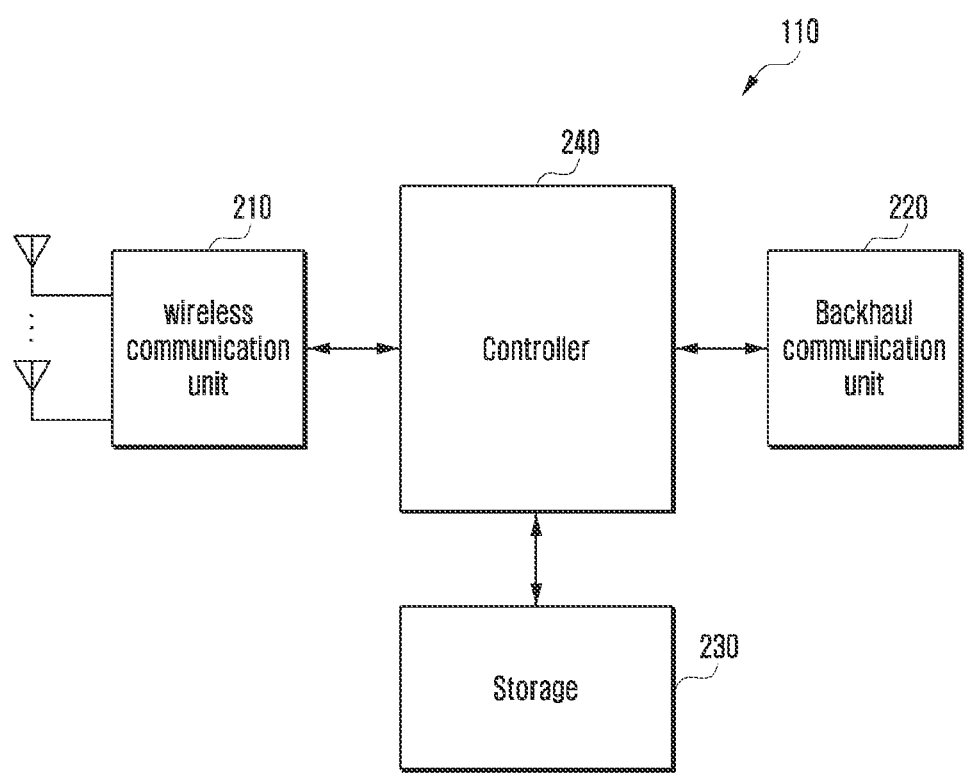
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. Terms such as '-unit', '-device' used hereinafter refer to a unit that processes at least one function or operation, which may be implemented in hardware or software, or in a combination of hardware and software.

With reference to FIG. 2, the base station includes a wireless communication unit 210, a backhaul communication unit 220, a storage 230, and a controller 240.

The wireless communication unit 210 performs functions for transmitting and receiving signals through a wireless channel. For example, the wireless communication unit 210 performs a conversion function between a baseband signal and a bit string according to the physical layer standard of the system. For example, when transmitting data, the wireless communication unit 210 may encode and modulate a transmission bit string to generate complex symbols. Further, when receiving data, the wireless communication unit 210 restores a received bit string through demodulation and decoding of a baseband signal.

Further, the wireless communication unit 210 up-converts a baseband signal into a radio frequency (RF) band signal, transmits the RF band signal through the antenna, and down-converts the RF band signal received through the antenna into a baseband signal. To this end, the wireless communication unit 210 may include a transmission filter, a reception filter, an amplifier, a mixer, an oscillator, a digital to analog convertor (DAC), an analog to digital convertor (ADC), and the like. Further, the wireless communication unit 210 may include a plurality of transmission and reception paths. Furthermore, the wireless communication unit 210 may include at least one antenna array consisting of a plurality of antenna elements.

In terms of hardware, the wireless communication unit 210 may be configured with a digital unit and an analog unit, and the analog unit may be configured with a plurality of sub-units according to operating power, operating frequency, and the like. The digital unit may be implemented into at least one processor (e.g., digital signal processor (DSP)).

The wireless communication unit 210 transmits and receives a signal, as described above. Accordingly, all or part of the wireless communication unit 210 may be referred to as a 'transmitter', 'receiver', or 'transceiver'. Further, in the following description, transmission and reception performed through a wireless channel are used in a meaning including that processing is performed, as described above by the wireless communication unit 210. According to an embodiment, the wireless communication unit 210 may include at least one transceiver.

The backhaul communication unit 220 provides an interface for performing communication with other nodes in the network. That is, the backhaul communication unit 220 converts bit strings transmitted from the base station to other nodes, for example, other connection nodes, other base stations, higher nodes, core networks, and the like, into physical signals, and converts physical signals received from other nodes into bit strings.

The storage 230 stores data such as basic programs, application programs, and configuration information for an operation of the base station. The storage 230 may be configured with a volatile memory, a non-volatile memory, or a combination of a volatile memory and a non-volatile memory. Further, the storage 230 provides stored data according to a request of the controller 240. According to an embodiment, the storage 230 may include a memory.

The controller 240 controls the overall operation of the base station. For example, the controller 240 may transmit and receive signals through the wireless communication unit 210 or through the backhaul communication unit 220. Further, the controller 240 records data in the storage 230 and reads data from the storage 230. The controller 240 may perform functions of a protocol stack requested by the communication specification. According to another embodiment, the protocol stack may be included in the wireless communication unit 210. According to an embodiment, the controller 240 may include at least one processor.

According to various embodiments, the controller 240 may control the base station to perform operations according to various embodiments to be described later. For example, the controller 240 may perform a channel access procedure for an unlicensed band. For example, a transceiver (e.g., the wireless communication unit 210) may receive signals transmitted in an unlicensed band, and the controller 240 may compare the strength of the received signal with a predefined or determined threshold value of a function using a bandwidth or the like as a factor to determine whether the unlicensed band is in an idle state. Further, for example, the controller 240 may transmit a control signal to the UE through the transceiver or receive a control signal from the UE. Further, the controller 240 may transmit data to the UE through the transceiver or receive data from the UE. The controller 240 may determine the transmission result of the signal transmitted to the UE based on the control signal or data signal received from the UE. Further, for example, the controller 240 may maintain or change a contention window value (hereinafter, contention window adjustment) for the channel access procedure based on the transmission result, that is, based on the reception result of the UE for the control signal or the data signal. According to various embodiments, in order to obtain a transmission result for contention window adjustment, the controller 240 may determine a reference slot. The controller 240 may determine a data channel for contention window adjustment in the reference slot. The controller 240 may determine a reference control channel for contention window adjustment in the reference slot. In case that it is determined that the unlicensed band is in an idle state, the controller 240 may occupy the channel.

Figure 3:
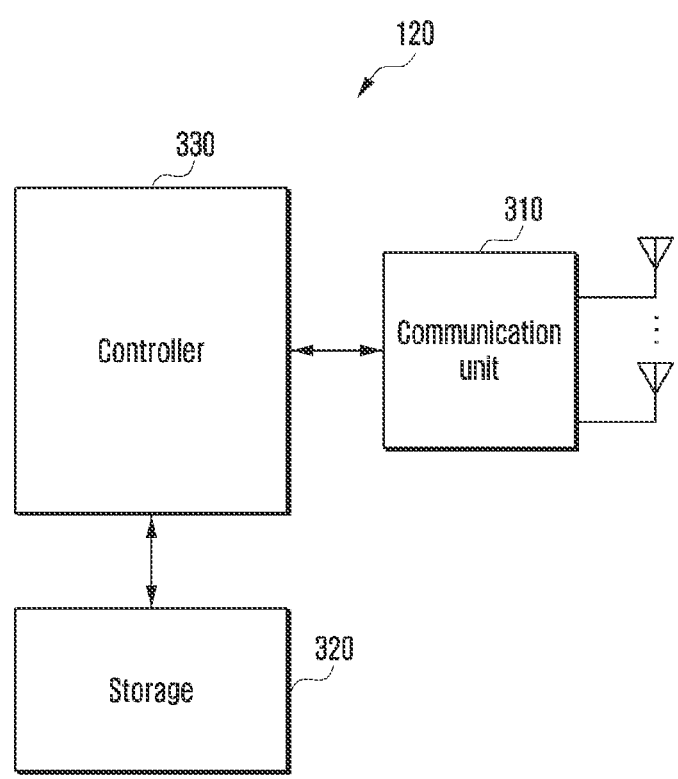
FIG. 3 illustrates a configuration of a terminal in a wireless communication system according to various embodiments of the disclosure.

FIG. 3 is a diagram illustrating a configuration of a UE in a wireless communication system according to various embodiments of the disclosure. The configuration illustrated in FIG. 3 may be understood as a configuration of the UE 120. Terms such as '-unit' and '-device' used hereinafter refer to a unit that processes at least one function or operation, which may be implemented in hardware or software, or a combination of hardware and software.

With reference to FIG. 3, the UE includes a communication unit 310, a storage 320, and a controller 330.

The communication unit 310 performs functions of transmitting and receiving signals through a wireless channel. For example, the communication unit 310 may perform a function of converting a baseband signal and a bit string according to the physical layer specification of the system. For example, when transmitting data, the communication unit 310 may encode and modulate transmission bit strings to generate complex symbols. Further, when receiving data, the communication unit 310 restores the received bit string through demodulation and decoding of the baseband signal. Further, the communication unit 310 up-converts the baseband signal into an RF band signal, transmits the RF band signal through the antenna, and down-converts the RF band signal received through the antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission and reception paths. Further, the communication unit 310 may include at least one antenna array consisting of a plurality of antenna elements. In view of hardware, the communication unit 310 may be configured with a digital circuit and an analog circuit (e.g., radio frequency integrated circuit (RFIC)). Here, the digital circuit and the analog circuit may be implemented in one package. Further, the communication unit 310 may include a plurality of RF chains. Further, the communication unit 310 may perform beamforming.

The communication unit 310 transmits and receives a signal, as described above. Accordingly, all or part of the communication unit 310 may be referred to as a 'transmitter', a 'receiver' or a 'transceiver'. Further, in the following description, transmission and reception performed through a wireless channel are used in a meaning including that processing is performed, as described above by the communication unit 310. According to an embodiment, the wireless communication unit 210 may include at least one transceiver.

The storage 320 stores data such as basic programs, application programs, and configuration information for an operation of the UE. The storage 320 may be configured with a volatile memory, a non-volatile memory, or a combination of a volatile memory and a non-volatile memory. Further, the storage 320 provides stored data according to the request of the controller 330. According to an embodiment, the storage 320 may include a memory.

The controller 330 controls the overall operations of the UE. For example, the controller 330 may transmit and receive signals through the communication unit 310. Further, the controller 330 records data in the storage 320 and reads data from the storage 320. The controller 330 may perform functions of a protocol stack required by the communication specification. To this end, the controller 330 may include at least one processor or a microprocessor, or may be part of a processor. According to an embodiment, the controller 330 may include at least one processor. Further, according to an embodiment, a portion of the communication unit 310 and/or the controller 330 may be referred to as a communication processor (CP).

According to various embodiments, the controller 330 may control the UE to perform operations according to various embodiments to be described later. For example, the controller 330 may receive a downlink signal (downlink control signal or downlink data) transmitted by the base station through the transceiver (e.g., the communication unit 310). Further, for example, the controller 330 may determine the transmission result for the downlink signal. The transmission result may include information on feedback of ACK, NACK, DTX, and the like of the transmitted downlink signal. In the disclosure, the transmission result may be referred to as various terms such as a reception state of a downlink signal, the received result, the decoding result, and HARQ-ACK information. Further, for example, the controller 330 may transmit, to the base station, an uplink signal as a response signal to the downlink signal through the transceiver. The uplink signal may explicitly or implicitly include the transmission result of the downlink signal.

The controller 330 may perform channel access procedures for an unlicensed band. For example, the transceiver (e.g., the communication unit 310) may receive signals transmitted in an unlicensed band, and the controller 330 may compare the strength of the received signal with a predefined or determined threshold value of a function using a bandwidth or the like as a factor to determine whether the unlicensed band is in an idle state. In order to transmit a signal to the base station, the controller 330 may perform an access procedure for an unlicensed band.

Figure 4:
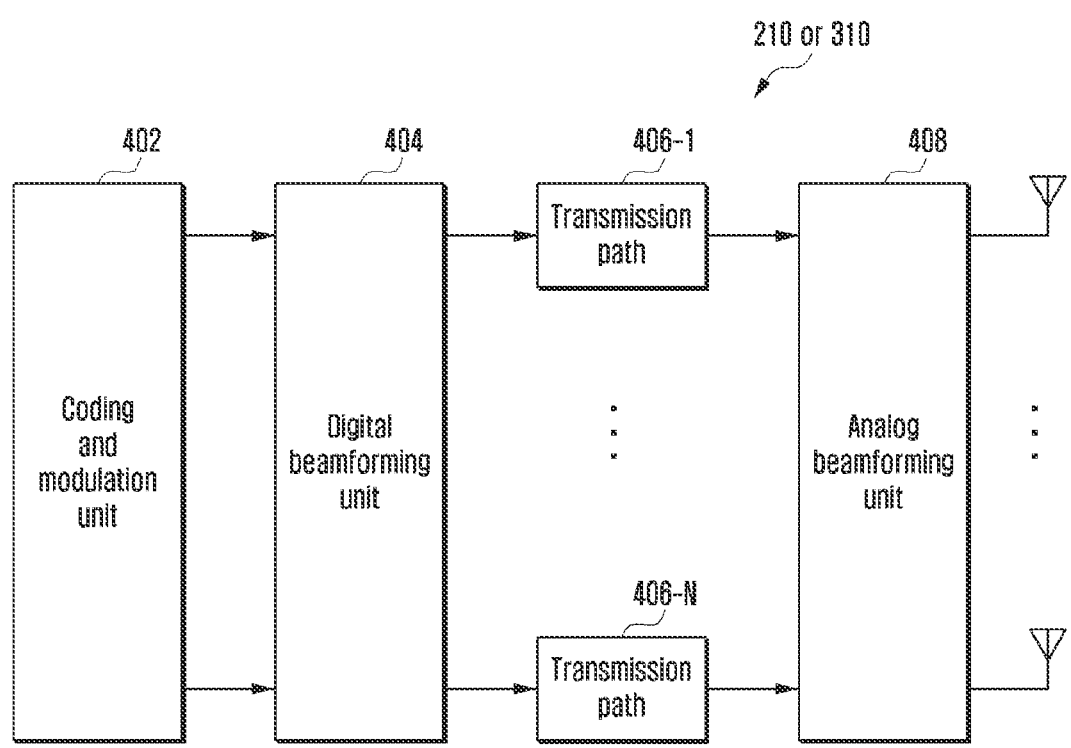
FIG. 4 illustrates a configuration of a communication unit in a wireless communication system according to various embodiments of the disclosure.

FIG. 4 is a diagram illustrating a configuration of a communication unit in a wireless communication system according to various embodiments of the disclosure. FIG. 4 illustrates an example of a detailed configuration of the wireless communication unit 210 of FIG. 2 or the communication unit 310 of FIG. 3. Specifically, FIG. 4 is part of the wireless communication unit 210 of FIG. 2 or the communication unit 310 of FIG. 3 and illustrates components for performing beamforming.

With reference to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity check (LDPC) code, a convolution code, or a polar code may be used. The encoding and modulation unit 402 performs constellation mapping to generate modulation symbols.

The digital beamforming unit 404 performs beamforming on a digital signal (e.g., modulation symbols). To this end, the digital beamforming unit 404 multiplies modulation symbols by beamforming weights. Here, beamforming weights are used for changing the magnitude and phase of the signal and may be referred to as a 'precoding matrix', a 'precoder', and the like. The digital beamforming unit 404 outputs digital beamformed modulation symbols to a plurality of transmission paths 406-1 to 406-N. In this case, according to the multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert digital beamformed digital signals into analog signals. To this end, each of the plurality of transmission paths 406-1 to 406-N may include an inverse fast Fourier transform (IFFT) operator, a cyclic prefix (CP) inserter, a DAC, and an up-converter. The CP inserter is for an orthogonal frequency division multiplexing (OFDM) scheme and may be excluded in case that other physical layer schemes (e.g., filter bank multi-carrier (FBMC)) are applied. That is, the plurality of transmission paths 406-1 to 406-N provide an independent signal processing process for a plurality of streams generated through digital beamforming. However, according to an implementation method, some components of the plurality of transmission paths 406-1-406-N may be used in common.

The analog beamforming unit 408 performs beamforming on an analog signal. To this end, the analog beamforming unit 408 multiplies the analog signals by beamforming weights. Here, beamforming weights are used for changing a magnitude and phase of the signal. Specifically, according to a plurality of transmission paths 406-1 to 406-N and a connection structure between antennas, the analog beamforming unit 408 may be variously configured. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one antenna array or connected to two or more antenna arrays.

In a 5G system, in consideration of various services and requirements, a frame structure needs to be defined flexibly. For example, each service may have different subcarrier spacing according to the requirements. The current 5G communication system supports a plurality of subcarrier spacings, and the subcarrier spacing may be determined from [Equation 1].

$$\Delta f = f_0 * 2^m \qquad \text{[Equation 1]}$$

In Equation 1, $f_0$ represents basic subcarrier spacing of the system, m represents a scaling factor of the integer, and $\Delta f$ represents subcarrier spacing. For example, if $f_0$ is 15 kHz, a set of subcarrier spacings that the 5G communication system may have may be configured with one of 3.75 kHz, 7.5 kHz, 15 kHz, 30 kHz, 60 kHz, 120 kHz, 240 kHz, and 480 kHz. An available subcarrier spacing set may vary according to the frequency band. For example, in a frequency band of 7 GHz or less, at least one subcarrier spacing of 3.75 kHz, 7.5 kHz, 15 kHz, 30 kHz, or 60 kHz may be used, and in a frequency band of 7 GHz or more, at least one subcarrier spacing of 60 kHz, 120 kHz, 240 kHz, or more may be used.

Figure 5:
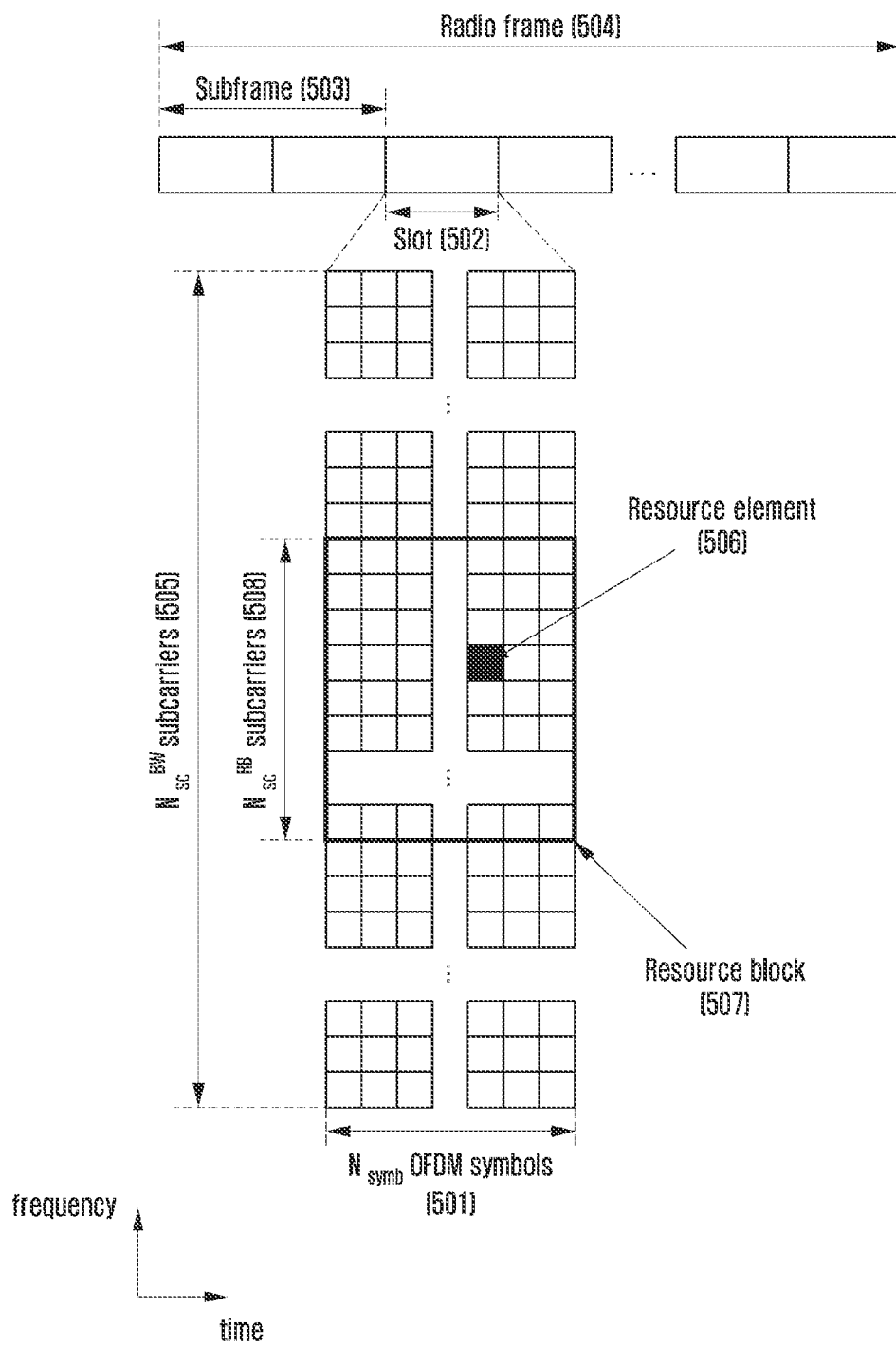
FIG. 5 illustrates an example of a radio resource area in a wireless communication system according to various embodiments of the disclosure.

In various embodiments, a length of the corresponding OFDM symbol may vary according to subcarrier spacing constituting the OFDM symbol. This is because, as a characteristic of OFDM symbols, subcarrier spacing and the length of the OFDM symbol have an inverse relationship with each other. For example, when the subcarrier spacing is doubled, the symbol length is reduced to ½, and conversely, when the subcarrier spacing is reduced to ½, the symbol length is doubled. FIG. 5 is a diagram illustrating an example of a radio resource area in a wireless communication system according to various embodiments of the disclosure. In various embodiments, a radio resource area may include a structure of a time-frequency domain. In various embodiments, the wireless communication system may include an NR communication system.

With reference to FIG. 5, in the radio resource area, a horizontal axis represents a time domain and a vertical axis represents a frequency domain. A minimum transmission unit in the time domain may be an orthogonal frequency division multiplexing (OFDM) and/or discrete Fourier transform-spread-OFDM (DFT-s-OFDM) symbol, and the $N_{symb}$ number of OFDM and/or DFT-s-OFDM symbols 501 may be gathered to configure one slot 502. In various embodiments, the OFDM symbol may include a symbol for a case of transmitting and receiving signals using an OFDM multiplexing scheme, and the DFT-s-OFDM symbol may include a symbol for a case of transmitting and receiving signals using a DFT-s-OFDM or single carrier frequency division multiple access (SC-FDMA) multiplexing scheme. Hereinafter, in the disclosure, for convenience of description, an embodiment for OFDM symbols is described, but such an embodiment is also applicable to an embodiment for a DFT-s-OFDM symbol. Further, in the disclosure, for convenience of description, an embodiment related to transmission and reception of a downlink signal is described, but this is also applicable to an embodiment related to transmission and reception of an uplink signal.

In case that subcarrier spacing (SCS) is 15 kHz, as illustrated in FIG. 5, one slot 502 constitutes one subframe 503, and a length of the slot 502 and the subframe 503 may be 1 ms, respectively. In various embodiments, the number of slots 502 constituting one subframe 503 and the length of the slot 502 may vary according to the subcarrier spacing. For example, in case that the subcarrier spacing is 30 kHz, 2 slots may constitute one subframe 503. In this case, a length of the slot is 0.5 ms and a length of the subframe 503 is 1ms. A radio frame 504 may be a time domain segment consisting of 10 subframes. The minimum transmission unit in the frequency domain is a subcarrier, and a carrier bandwidth constituting a resource grid may be configured with the total $N_{sc}^{BW}$ number of subcarriers 505.

However, the subcarrier spacing, the number of slots 502 included in the subframe 503, the length of the slot 502, and the length of the subframe 503 may be applied variably. For example, in case of an LTE system, the subcarrier spacing is 15 kHz, and two slots constitute one subframe 503, wherein the length of the slot 502 may be 0.5 ms and the length of the subframe 503 may be 1 ms. For another example, in case of the NR system, the subcarrier spacing may be one of 15 kHz, 30 kHz, 60 kHz, 120 kHz, and 240 kHz, and the number of slots included in one subframe according to the subcarrier spacing may be 1, 2, 4, 8, and 16.

In the time-frequency domain, a basic unit of the resource may be a resource element (RE) 506, and the resource element 506 may be represented by an OFDM symbol index and a subcarrier index. The resource block may include a plurality of resource elements. In an LTE system, a resource block (RB) (or physical resource block (PRB)) may be defined as the $N_{symb}$ number of consecutive OFDM symbols in the time domain and the $N_{SC}^{RB}$ number of consecutive subcarriers in the frequency domain. The number of symbols included in one RB may be $N_{symb}$=14, the number of subcarriers may be $N_{SC}^{RB}$=12, the number of symbols included in one RB may be $N_{symb}$=7, the number of subcarriers may be $N_{SC}^{RB}$=12, and the number $N_{RB}$ of RBs may vary according to a bandwidth of a system transmission band. In an NR system, a resource block RB 507 may be defined as the $N_{SC}^{RB}$ number of consecutive subcarriers in the frequency domain. The number of subcarriers may be $N_{SC}^{RB}$=12. The frequency domain may include common resource blocks (CRBs), and a physical resource block (PRB) may be defined in a bandwidth part (BWP) on the frequency domain. The CRB and PRB numbers may be determined differently according to the subcarrier spacing.

Downlink control information may be transmitted at the first N number of OFDM symbol(s) in the slot. In general, N={1, 2, 3}, and the UE may receive a configuration of the number of symbols in which downlink control information may be transmitted through higher layer signaling from the base station. Further, according to an amount of control information to be transmitted in a current slot, the base station may change the number of symbols in which downlink control information may be transmitted in the slot per slot, and transmit information on the number of symbols to the UE through a separate downlink control channel.

In the NR and/or LTE system, scheduling information on downlink data or uplink data may be transmitted from the base station to the UE through downlink control information (DCI). In various embodiments, DCI may be defined according to various formats, and each format may represent whether DCI includes scheduling information (e.g., UL grant) for uplink data or scheduling information (DL grant) for downlink data, whether the magnitude of the control information is small compact DCI or fall-back DCI, whether spatial multiplexing using multiple antennas is applied, and/or whether the DCI is DCI for power control.

For example, a DCI format (e.g., DCI format 1_0 of NR), which is scheduling control information (DL grant) for downlink data, may include at least one of the following control information. The NR DCI format 1_0 may include scheduling for downlink data.

DCI format identifier: an identifier that distinguishes a format of DCI

Frequency domain resource assignment: indicates an RB allocated for data transmission.

Time domain resource assignment: indicates a slot and symbol allocated for data transmission.

VRB-to-PRB mapping: indicates whether a virtual resource block (VRB) mapping scheme is applied Modulation and coding scheme (MCS): indicates a modulation scheme used for transmitting data and a size of a transport block, which is data to be transmitted.

New data indicator: indicates whether HARQ initial transmission or retransmission Redundancy version: indicates a redundancy version of HARQ.

HARQ process number: indicates the process number of HARQ.

PDSCH assignment information (Downlink assignment index): indicates, to the UE, the number of PDSCH reception results (e.g., the number of HARQ-ACKs) to be reported to the base station Transmission power control (TPC) command for a physical uplink control channel (PUCCH): indicates a transmission power control command for a PUCCH, which is an uplink control channel.

PUCCH resource indicator: indicates a PUCCH resource used for HARQ-ACK report including the reception result for the PDSCH configured through the corresponding DCI PUCCH transmission timing indicator (PDSCH-to-HARQ_feedback timing indicator): indicates slot or symbol information in which a PUCCH for HARQ-ACK report including the reception result for a PDSCH configured through corresponding DCI should be transmitted DCI may be transmitted on an enhanced PDCCH (EPDCCH) (or enhanced control information, hereinafter, may be used interchangeably) or a physical downlink control channel (PDCCH) (or control information, hereinafter, may be used interchangeably), which is a downlink physical control channel through a channel coding and modulation process. Hereinafter, transmission and reception of a PDCCH or EPDCCH may be understood as DCI transmission and reception on the PDCCH or EPDCCH, and transmission and reception of a physical downlink shared channel (PDSCH) may be understood as downlink data transmission and reception on a PDSCH.

In various embodiments, a cyclic redundancy check (CRC) scrambled with a specific radio network temporary identifier (RNTI) (or UE identifier C-RNTI (Cell-RNTI)) independent of each UE is added to DCI, and DCI for each UE may be channel-coded and then be configured and transmitted as an independent PDCCH. In the time domain, the PDCCH may be transmitted during a control channel transmission period. A mapping position of the PDCCH in the frequency domain may be determined by an identifier (ID) of at least each UE, and be transmitted in a configured frequency band among the system transmission band or the entire system transmission band. Alternatively, a mapping position of the PDCCH in the frequency domain may be configured by higher layer signaling.

Downlink data may be transmitted on a physical downlink shared channel (PDSCH), which is a physical channel for downlink data transmission. The PDSCH may be transmitted after the control channel transmission period, and scheduling information such as a mapping location of the PDSCH in the frequency domain, and a modulation scheme for the PDSCH may be determined based on DCI transmitted through the PDCCH.

Through a modulation coding scheme (MCS) among control information constituting DCI, the base station may notify the UE of a modulation scheme applied to the PDSCH to be transmitted and a size (transport block size (TBS)) of data to be transmitted. In various embodiments, the MCS may be configured with bits of 5 bits or more or 5 bits or less. The TBS corresponds to the size of a TB before channel coding for error correction is applied to data (transport block (TB)) to be transmitted by the base station.

A modulation scheme supported for uplink and downlink data transmission in the NR system may include at least one of quadrature phase shift keying (QPSK), quadrature amplitude modulation (16QAM), 64QAM, or 256QAM, and each modulation order $Q_m$ may be 2, 4, 6, or 8. That is, 2 bits per symbol for QPSK modulation, 4 bits per symbol for 16QAM modulation, 6 bits per symbol for 64QAM modulation, and 8 bits per symbol for 256QAM modulation may be transmitted. Further, a modulation scheme of 256QAM or more may be used according to system modification. In case of a system that performs communication in an unlicensed band, a communication device (base station or UE) that intends to transmit a signal through an unlicensed band performs a channel access procedure or listen-before talk (LBT) for an unlicensed band that intends to perform communication before transmitting a signal, and in case that it is determined that the unlicensed band is in an idle state according to the channel access procedure, the communication device may access the unlicensed band to perform signal transmission. In case that it is determined that the unlicensed band is not in an idle state according to the performed channel access procedure, the communication device may not perform signal transmission.

The channel access procedure in the unlicensed band may be classified according to whether a channel access procedure start time point of the communication device is fixed (frame-based equipment, FBE) or variable (load-based equipment). The communication device may be determined as an FBE device or an LBE device according to whether a transmit and receive structure of the communication device has one cycle other than the channel access procedure start time point. Here, the fact that the channel access procedure start time point is fixed means that a channel access procedure of the communication device may be started periodically according to a predefined cycle or a cycle declared or configured by the communication device. As another example, the fact that the channel access procedure start time point is fixed may mean that the transmit and receive structure of the communication device has one cycle. Here, the fact that the channel access procedure start time point is variable means that the channel access procedure start time of the communication device is possible at any time in case that the communication device intends to transmit a signal through the unlicensed band. As another example, the fact that the channel access procedure start time point is variable may mean that the transmit and receive structure of the communication device does not have one cycle and may be determined as needed. Hereinafter, a channel access procedure (hereinafter, a traffic-based channel access procedure or a LBE-based channel access procedure) of a case that the channel access procedure start time point of the communication device is variable (load-based equipment (LBE)) is described.

The channel access procedure in the unlicensed band may include a procedure in which the communication device measures the strength of a signal received through the unlicensed band for a fixed time or a time calculated according to a predefined rule (e.g., a time calculated through one random value selected by at least a base station or a UE) and compares the strength of the signal with a threshold calculated by a function of determining the received signal strength according to at least one variable of a predefined threshold value, a channel bandwidth, a bandwidth of a signal to be transmitted, and/or the strength of transmission power to determine an idle state of the unlicensed band.

For example, the communication device may measure the strength of a signal received for Xus (e.g., 25 us) immediately before a time point at which a signal is to be transmitted, and in case that the measured signal strength is smaller than a predefined or calculated threshold value T (e.g., −72 dBm), the communication device may determine that the unlicensed band is in an idle state, and transmit the configured signal. In this case, after the channel access procedure, the maximum time that may continuously transmit a signal may be limited according to the maximum channel occupancy time defined for each country, region, frequency band according to each unlicensed band, and may also be limited according to the type of the communication device (e.g., base station or UE, or master device or slave device). For example, in case of Japan, in a 5 GHz unlicensed band, a base station or a UE may transmit a signal by occupying a channel without performing an additional channel access procedure for a time of the maximum 4 ms for the unlicensed band determined to be in an idle state after performing the channel access procedure.

More specifically, in case that the base station or the UE intends to transmit a downlink or uplink signal in an unlicensed band, a channel access procedure that may be performed by the base station or the UE may be divided into at least the following types:

Type 1: Transmission of an uplink/downlink signal after performing a channel access procedure for a variable time Type 2: Transmission of an uplink/downlink signal after performing a channel access procedure for a fixed time Type 3: Transmission of a downlink or uplink signal without performing a channel access procedure A transmitting device (e.g., base station or UE) that intends to perform signal transmission in an unlicensed band may determine a scheme (or type) of the channel access procedure according to a type of a signal to transmit. In the third generation partnership project (3GPP), an LBT procedure, which is a channel access scheme, may be broadly divided into 4 categories. The four categories may include a first category, which is a scheme of not performing LBT, a second category, which is a scheme of performing LBT without random backoff, a third category, which is a scheme of performing LBT through random backoff in a fixed size contention window, and a fourth category, which is a scheme of performing LBT through random backoff in a variable size competitive window. According to an embodiment, a type 1 may illustrate the third category and the fourth category, a type 2 may illustrate the second category, and a type 3 may illustrate the first category. In this case, the type 2 or the second category performing the channel access procedure for a fixed time may be divided into one or more types according to the fixed time of performing the channel access procedure. For example, the type 2 may be divided into a type of performing the channel access procedure during an Aus fixed time (e.g., 25 us) and a type of performing a channel access procedure during a Bus fixed time (e.g., 16 us).

Hereinafter, in the disclosure, for convenience of description, the transmitting device is assumed to a base station, and the transmitting device and the base station may be used interchangeably.

For example, in case that the base station intends to transmit a downlink signal including a downlink data channel in an unlicensed band, the base station may perform a channel access procedure of a type 1 scheme. In case that the base station intends to transmit a downlink signal that does not include a downlink data channel in an unlicensed band, for example, in case that the base station intends to transmit a synchronous signal or a downlink control channel, the base station may perform a channel access procedure of a type 2 scheme and transmit a downlink signal.

In this case, a scheme of the channel access procedure may be determined according to a transmission length of a signal to be transmitted in an unlicensed band or a length of a time or period used by occupying an unlicensed band. In general, in the type 1 scheme, the channel access procedure may be performed for a longer time than performing the channel access procedure in the type 2 scheme. Accordingly, in case that the communication device intends to transmit a signal for a short time period or for a time of a reference time (e.g., Xms or Y symbols) or less, a channel access procedure of a type 2 scheme may be performed. However, in case that the communication device intends to transmit a signal during a long time period or for a time exceeding a reference time (e.g., Xms or Y symbols) or a reference time or more, a channel access procedure of a type 1 scheme may be performed. In other words, according to a use time of the unlicensed band, different schemes of channel access procedures may be performed.

In case that the transmitting device performs a channel access procedure of the type 1 scheme according to at least one of the above-described references, the transmitting device that intends to transmit a signal in an unlicensed band may determine a channel access priority class (or channel access priority) according to a quality of service class identifier (QCI) of a signal to be transmitted in the unlicensed band and perform a channel access procedure using at least one of predefined configuration values, as illustrated in Table 1 for the determined channel access priority class. Table 1 illustrates the mapping relationship between the channel access priority class and QCI. In this case, the mapping relationship between the channel access priority class and QCI, as illustrated in Table 1 is only one example, and is not limited thereto.

For example, QCI 1, 2, and 4 refer to QCI values, respectively for services such as a conversational voice, conversational video (live streaming), and non-conversational video (buffered streaming). In case that the transmitting device intends to transmit a signal for a service that does not match QCI of Table 1 in an unlicensed band, the transmitting device may select QCI closest to the service and the QCI of Table 1 and select a channel access priority class therefor.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

In various embodiments, parameter values (e.g., defer duration according to the determined channel access priority p, the set (CW_p) of contention window values or sizes and the minimum value and maximum value (CW_min,p, CW_max,p) of the contention window, and the maximum channel occupancy period T_mcot,p for the channel access priority class may be determined as illustrated in Table 2. Table 2 illustrates parameter values for the channel access priority class in case of a downlink.

Figure 6:
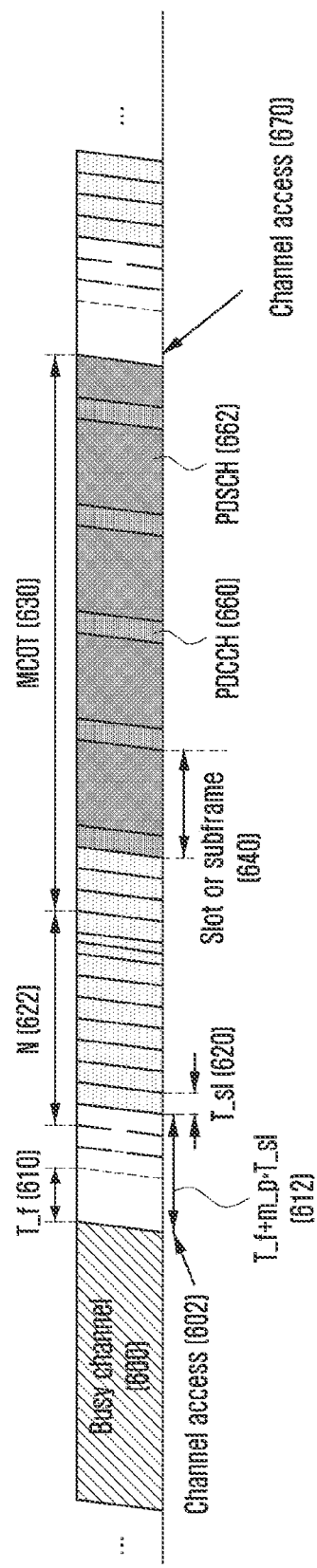
FIG. 6 illustrates an example of a channel access procedure in an unlicensed band in a wireless communication system according to various embodiments of the disclosure.

FIG. 6 is a diagram illustrating an example of a channel access procedure in an unlicensed band in a wireless communication system according to various embodiments of the disclosure. A situation is described in which a base station performs a channel access procedure so as to occupy an unlicensed band. As the base station, the base station 110 of FIG. 1 is illustrated. According to FIG. 6, a base station that intends to transmit a downlink signal in an unlicensed band may perform a channel access procedure for an unlicensed band for a minimum T_f+m_p*T_sl time (e.g., defer duration 612 of FIG. 6). In case that the base station intends to perform the channel access procedure with a channel access priority class 3 (p=3), a size of T_f+m_p*T_sl may be configured using m_p=3 for a size T_f+m_p*T_sl of the defer duration required to perform the channel access procedure. Here, T_f is a value (e.g., period 610 of FIG. 6) fixed to 16 us, of which a first T_sl time should be in an idle state, and the base station may not perform a channel access procedure at the remaining time T_f−T_sl after a T_sl time of the T_f time. In this case, even if the base station performed the channel access procedure at the remaining time T_f−T_sl, the result of the channel access procedure may not be used. In other words, the T_f−T_sl time is a time that delays execution of the channel access procedure at the base station.

In case that it is determined that the unlicensed band is in an idle state at all m_p*T_sl time, it may be that N=N−1. In this case, N may be selected as any integer value between 0 and a value CW_p of the contention window at a time point of performing the channel access procedure. In case of a channel access priority class 3, the minimum contention window value and the maximum contention window value are 15 and 63, respectively. In case that it is determined that the unlicensed band is in an idle state in defer duration and an additional period performing the channel access procedure, the base station may transmit a signal through the unlicensed band for T_mcot,p time (8 ms). Table 2 illustrates a channel access priority class (or channel access priority) at the downlink. In the disclosure, for convenience of description, embodiments are described based on the downlink channel access priority class. In case of an uplink, the channel access priority class of Table 2 may be equally used, or a separate channel access priority class for uplink transmission may be used.

TABLE 2

| Channel Access Priority Class (p) | $m_p$ | $CW_{min,p}$ | $CW_{max,p}$ | $T_{mcot,p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value CW_p is the minimum value CW_min,p of the contention window. The base station that has selected an N value may perform the channel access procedure in the T_sl period (e.g., slot period 620 of FIG. 6), and in case that the unlicensed band is determined to an idle state through the channel access procedure performed in the T_sl period, the base station may change the value to N=N−1, and in case that N=0, the base station may transmit the signal through the unlicensed band for up to T_mcot,p time (e.g., the maximum occupancy time 630 of FIG. 6). In case that the unlicensed band determined through the channel access procedure is not an idle state at the T_sl time, the base station may perform again the channel access procedure without changing the N value.

A magnitude of the contention window (CW_p) value may be changed or maintained according to a ratio Z of NACK among received results (ACK/NACK) for downlink data received in downlink data, that is, a reference subframe, reference slot, or reference TTI in which at least one UE that has received downlink data transmitted through a downlink data channel in a reference subframe, a reference slot, or a reference TTI has transmitted or reported to the base station. In this case, the reference subframe, reference slot, or reference transmission interval (reference TTI) may be determined as a first subframe, slot, or transmit time interval (TTI) of a downlink signal transmission interval (or maximum channel occupancy time (MCOT)) most recently transmitted by the base station through the unlicensed band or a start subframe, a start slot, or a start transmission interval of the transmission interval at a time point at which the base station starts an channel access procedure, a time point at which the base station selects the N value in order to perform the channel access procedure, or just before two time points.

With reference to FIG. 6, in order to occupy an unlicensed band, the base station may attempt channel access. A subframe or a transmission interval 640 or a first slot (or a start slot starting a channel occupancy period) of a downlink signal transmission interval (channel occupancy time, hereinafter, may be mixed with MCOT) 630 most recently transmitted by the base station through the unlicensed band at a time point 670 at which the channel access procedure starts or immediately before a time point or at a time point at which the base station selects a value of N 622 in order to perform the channel access procedure may be defined as a reference slot, a reference subframe, or a reference transmission interval. For convenience of description, it is expressed as a reference slot below. Specifically, one or more consecutive slots including the first slot in which a signal is transmitted among all slots of the downlink signal transmission interval 630 may be defined as a reference slot. Further, according to an embodiment, in case that a downlink signal transmission interval starts after the first symbol of the slot, a slot in which downlink signal transmission starts and a slot following the slot may be defined as a reference slot. In case that a ratio of NACK is Z or more among reception results for downlink data transmitted or reported to the base station by one or more UEs that have received downlink data transmitted through the downlink data channel in such a reference slot, the base station may determine a value or size of the contention window used in the channel access procedure 670 of the corresponding base station as the next largest contention window compared to the contention window used in the previous channel access procedure 602. In other words, the base station may increase the size of the contention window used in the channel access procedure 602. By selecting the N 622 value in a range defined according to the contention window of the increased size, the base station may perform the next channel access procedure 670.

In case that the base station cannot obtain the reception result for a downlink data channel transmitted in the reference slot of a transmission interval 630, for example, in case that a time interval between the reference slot and a time point 670 at which the base station states the channel access procedure is less than or equal to n slots or symbols (i.e., in case that the base station initiates the channel access procedure before the minimum time that the UE may report the reception result for the downlink data channel transmitted in the reference slot to the base station), a first slot of the most recent downlink signal transmission interval transmitted before the downlink signal transmission interval 630 may be the reference slot.

In other words, in case that the base station does not receive, from the UE, the reception result for the downlink data transmitted at a time point 670 at which the base station initiates the channel access procedure, or in the reference slot 640 immediately before or at a time point at which the base station selects the N value in order to perform the channel access procedure, the base station may determine a contention window using the downlink data reception result of the UE for the reference slot in the most recently transmitted downlink signal transmission interval among the received results for the downlink data channel pre-received from the UE. The base station may determine the contention window size used in the channel access procedure 670 using the downlink data reception result received from the UEs with respect to the downlink data transmitted through the downlink data channel in the reference slot.

For example, a base station that has transmitted the downlink signal through the channel access procedure (e.g., CW_p=15) configured according to the channel access priority class 3 (p=3) may increase the contention window from an initial value (CW_p=15) to the next contention window value (CW_p=31) in case that 80% or more among reception results of the UE for downlink data transmitted to the UE through the downlink data channel in the reference slot are determined to NACK among downlink signals transmitted through an unlicensed band. A ratio value of 80% is exemplary, and various modifications are possible.

In case that the reception result of more than 80% or more among reception results of the UE is not determined to NACK, the base station may maintain a value of the contention window to the existing value or change a value of the contention window to an initial value of the contention window. In this case, the change of the contention window may be applied in common to all channel access priority class or may be applied only to the channel access priority class used in the channel access procedure. In this case, in the base slot in which a change in the size of the contention window is determined, a method of determining the received result valid for determination of the change in the contention window size among the receiving result for the downlink data transmitted or reported by the UE to the base station for downlink data transmitted through the downlink data channel, that is, a method of determining the Z value is as follows.

In case that the base station transmits one or more codewords (CW) or TB to one or more UEs in the reference slot, the base station may determine a Z value with a ratio of NACK among the reception results transmitted or reported by the UE for the TB received by the UE in the reference slot. For example, in case that 2 codewords or 2 TB are transmitted to one UE in the reference slot, the base station may receive or report the reception result of a downlink data signal for 2 TBs from the UE. In case that among 2 reception results, a ratio Z of NACK is equal to or greater than a threshold value (e.g., Z=80%) predefined or configured between the base station and the UE, the base station may change or increase the contention window size.

In this case, in case that the UE bundles the reception result of downlink data for one or more slots (e.g., the M number of slots), including the reference slot and transmits or reports the reception result to the base station, the base station may determine that the UE has transmitted the M number of reception results. Further, the base station may determine the Z value with a ratio of NACK among the M number of reception results, and change, maintain or initialize the contention window size.

In case that the reference slot is a second slot of two slots included in one subframe, or in case that a downlink signal is transmitted from a symbol after a first symbol in the reference slot, the reference slot and the next slot are determined to the reference slot, and the Z value may be determined with a ratio of NACK among the receiving results transmitted or reported to the base station by the UE for downlink data received in the reference slot.

Further, in case that scheduling information or downlink control information on a downlink data channel transmitted by the base station is transmitted in the same cell or frequency band as a frequency band or a cell in which the downlink data channel is transmitted, or in case that scheduling information or downlink control information on a downlink data channel transmitted by the base station is transmitted through an unlicensed band, but is transmitted in a cell or a frequency different from a cell in which the downlink data channel is transmitted, when it is determined that the UE does not transmit the reception result for downlink data received in the reference slot, and when the reception result for downlink data transmitted by the UE is determined to at least one of discontinuous transmission (DTX), NACK/DTX, or any state, the base station may determine the reception result of the UE to NACK to determine the Z value.

Further, in case that scheduling information or downlink control information on a downlink data channel transmitted by the base station is transmitted through a licensed band, when the reception result for downlink data transmitted by the UE is determined to at least one of DTX, NACK/DTX, or any state, the base station may not reflect the reception result of the UE to the reference value Z of the contention window variation. In other words, the base station may ignore the reception result of the UE and determine the Z value.

Further, in case that the base station transmits scheduling information or downlink control information on the downlink data channel through a license band, when the base station does not actually transmit downlink data (no transmission) among reception results of downlink data for a reference slot transmitted or reported by the UE to the base station, the base station may ignore the reception result transmitted or reported by the UE for downlink data and determine the Z value.

Hereinafter, a channel access procedure (hereinafter, a frame-based channel access procedure or an FBE-based channel access procedure) in case that a channel access procedure start time point of the communication device is fixed (frame-based equipment (FBE)) will be described with reference to FIG. 7.

Figure 7:
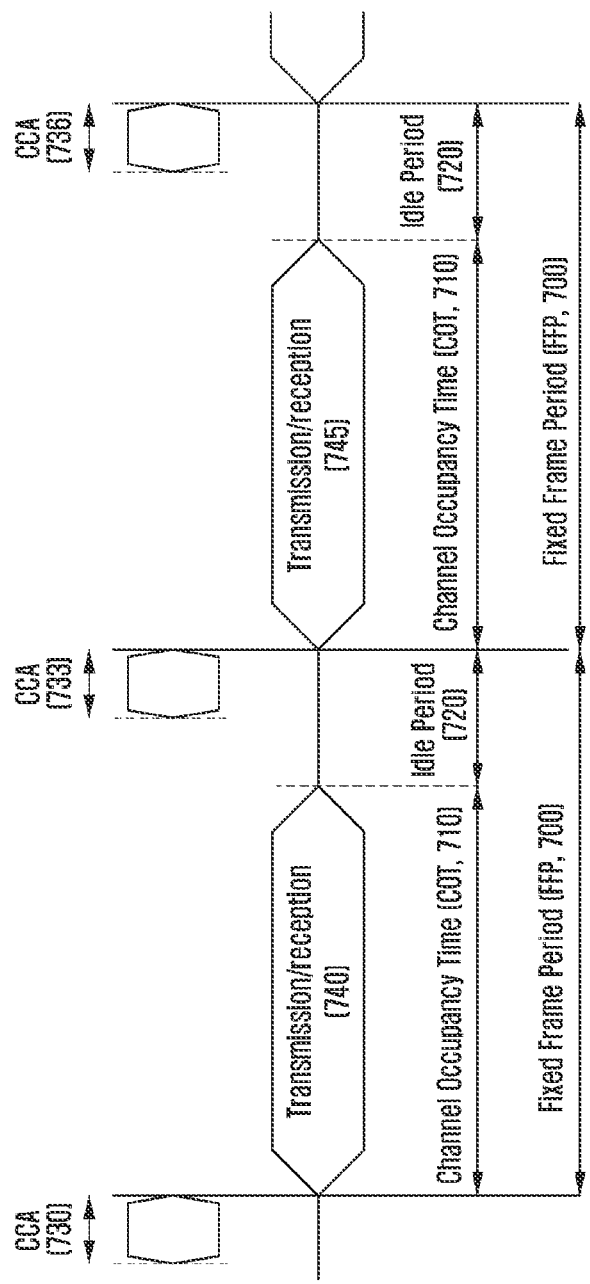
FIG. 7 illustrates another example of a channel access procedure in an unlicensed band in a wireless communication system according to various embodiments of the disclosure.

FIG. 7 illustrates another example of a channel access procedure in an unlicensed band in a wireless communication system according to various embodiments of the disclosure.

A communication device that performs a frame-based channel access procedure may periodically transmit and receive signals according to a fixed frame period (FFP). Here, a fixed frame period 700 may be declared or configured by a communication device (e.g., base station), and the fixed frame period may be configured from 1ms to 10 ms. In this case, a channel access procedure (or clear channel access (CCA)) for the unlicensed band may be performed immediately before 730, 733, and 736 the start of every frame period, and a channel access procedure may be performed for a fixed time or one observation slot, as in the above-described type 2 channel access procedure. In case that it is determined that an unlicensed band is in an idle state or an idle channel as a result of the channel access procedure, the communication device may transmit and receive signals without performing a separate channel access procedure for up to 95% time of the fixed frame period 700 (hereinafter, channel occupancy time (COT) 710). In this case, at least 5% time of the fixed frame period 700 is an idle period 720 and a signal cannot be transmitted and received, and a channel access procedure may be performed within the idle period 720.

A frame-based channel access procedure has the advantage that a method of performing a channel access procedure is relatively simple and that channel access of an unlicensed band may be performed periodically compared to a traffic-based channel access procedure. However, because the channel access procedure state time point is fixed, there is a disadvantage that the probability of being able to access the unlicensed band is reduced compared to the traffic-based channel access procedure.

Figure 8:
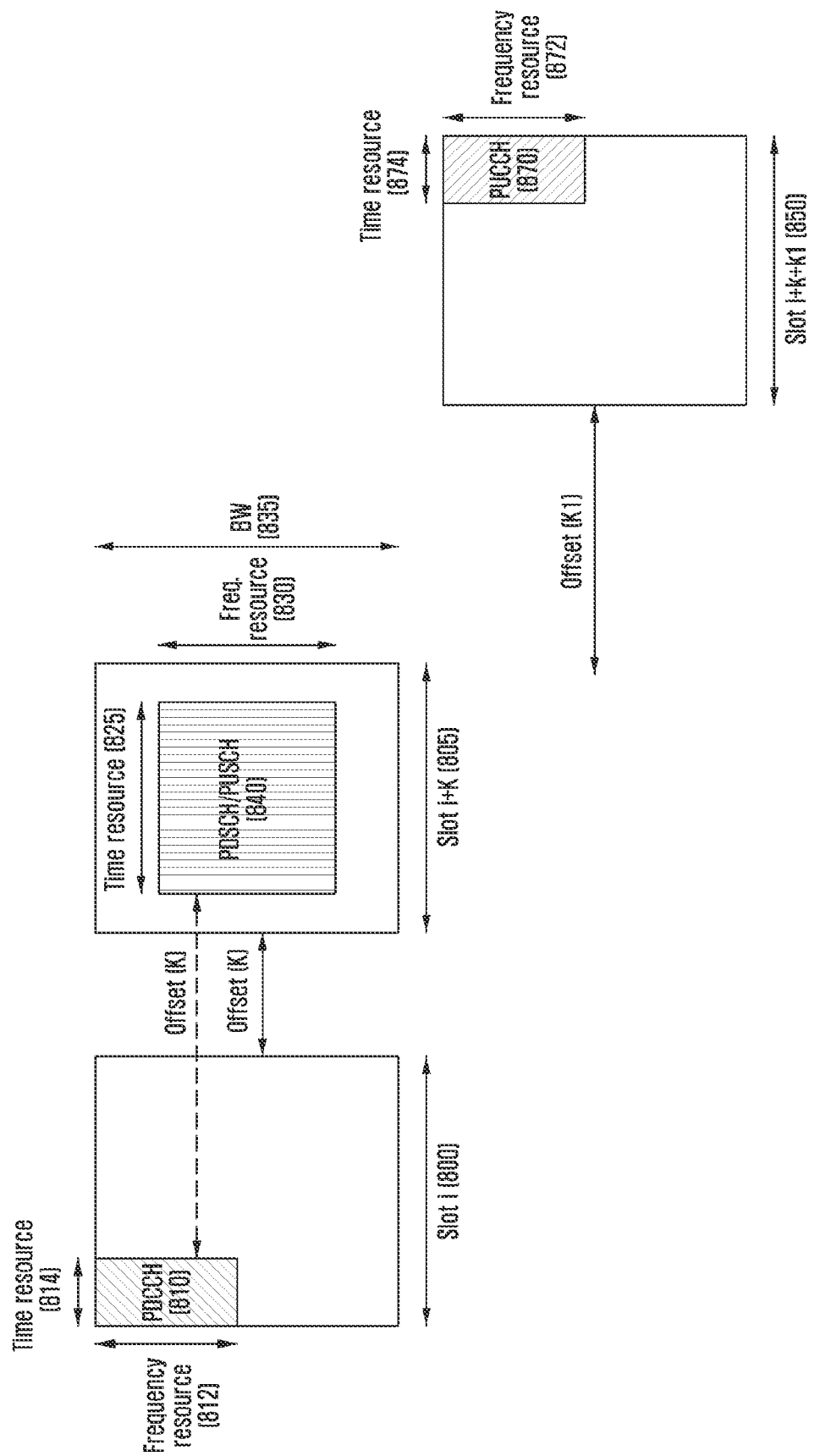
FIG. 8 illustrates an example of scheduling and feedback in a wireless communication system according to various embodiments of the disclosure.

FIG. 8 is a diagram illustrating an example of scheduling and feedback in a wireless communication system according to various embodiments of the disclosure. The base station may transmit control information including downlink and/or uplink scheduling to the UE. The base station may transmit downlink data to the UE. The UE may transmit HARQ-ACK information, which is feedback on downlink data, to the base station. Alternatively, the UE may transmit uplink data to the base station. In the NR system, uplink and downlink HARQ schemes may include an asynchronous HARQ scheme in which a data retransmission time point is not fixed. For example, in a downlink, in case that the base station receives HARQ NACK feedback from the UE for initial transmission data, the base station may freely determine a transmission time point of retransmission data according to a scheduling operation. For a HARQ operation, the UE may buffer data determined as an error as a result of decoding received data and then perform combining with data retransmitted from the base station. As the base station, the base station 110 of FIG. 1 is illustrated. As the UE, the UE 120 or the UE 130 of FIG. 1 is illustrated.

With reference to FIG. 8, a resource area in which a data channel is transmitted in a 5G or NR communication system is illustrated. The UE may monitor and/or search for a PDCCH 810 in a downlink control channel (hereinafter, PDCCH) area (hereinafter, control resource set (CORESET) or search space (SS)) configured through a higher signal from the base station. In this case, the downlink control channel area is configured with time domain 814 and frequency domain 812 information, and the time domain 814 information may be configured in a symbol unit, and the frequency domain 812 information may be configured in an RB or a group unit of an RB.

In case that the UE detects a PDCCH 810 in a slot I, 800, the UE may obtain downlink control information (DCI) transmitted through the detected PDCCH 810. Through the received downlink control information DCI, the UE may obtain scheduling information on the downlink data channel or the uplink data channel 840. In other words, the DCI may include resource area (or PDSCH transmission area) information in which at least the UE should receive a downlink data channel (hereinafter, PDSCH) transmitted from the base station, or resource area information in which the UE receives allocation from the base station for uplink data channel (PUSCH) transmission.

For example, a case in which the UE is scheduled to transmit an uplink data channel (PUSCH) will be exemplified as follows. The UE that has received DCI may obtain a slot index or offset information K that should receive a PUSCH through the DCI, and determine a PUSCH transmission slot index. For example, the UE may determine that it has been scheduled to transmit the PUSCH in a slot i+K 805 through received offset information K based on the slot index I, 800 that has received the PDCCH 810. In this case, the UE may determine a PUSCH start symbol or time in the slot i+K 805 or a slot i+K through the received offset information K based on the CORESET that has received the PDCCH 810.

Further, the UE may obtain information on the PUSCH transmission time-frequency resource domain 840 in the PUSCH transmission slot 805 in DCI. PUSCH transmission frequency resource domain information 830 may include information on a physical resource block (PRB) or a group unit of a PRB. The PUSCH transmission frequency resource domain information 830 may be information on an area included in an initial uplink bandwidth (BW) or an initial uplink bandwidth part (initial BWP) determined or configured by the UE through an initial access procedure. In case that the UE receives a configuration of an uplink bandwidth BW or an uplink bandwidth part BWP through a higher signal, the PUSCH transmission frequency resource domain information 830 may be information on an area included in the uplink bandwidth (BW) or the uplink bandwidth part (BWP) configured through a higher signal.

In various embodiments, the PUSCH transmission time resource area information 825 may be information on a symbol or a group unit of a symbol or information indicating absolute time information. The PUSCH transmission time resource domain information 825 may be expressed as a combination of a PUSCH transmission start time or symbol and a PUSCH length, or a PUSCH end time or a symbol to be included in DCI as one field or value. The UE may transmit the PUSCH in the PUSCH transmission resource area 840 determined through the DCI.

In various embodiments, the UE that has received the PDSCH 840 may report (feedback) the reception result (e.g., HARQ-ACK/NACK) for the PDSCH 840 to the base station. In this case, an uplink control channel (PUCCH) 870 transmission resource transmitting the reception result to the PDSCH 840 may be determined by the UE based on a PUCCH resource indicator and a PDSCH-to-HARQ timing indicator indicated through DCI scheduling the PDSCH 840. In other words, the UE that has received the PDSCH-to-HARQ timing indicator K1 through the DCI may transmit a PUCCH 870 from the PDSCH 840 reception slot 805 to a slot i+K+K1 850 after K1.

The base station may configure one or more K1 values to the UE through higher layer signaling or may indicate a specific K1 value to the UE through DCI, as described above. K1 may be determined according to a HARQ-ACK processing capability of the UE, that is, the minimum time required for the UE to receive a PDSCH and generate and report a HARQ-ACK for the PDSCH. Further, until the UE receives a configuration of the K1 value, the UE may use a predefined value or a default value as the K1 value.

In this case, in the PUCCH 870 transmission resource in the PUCCH transmission slot 850, the UE may perform PUCCH transmission at a resource indicated through the PDCCH resource indicator of DCI. In this case, in case that a plurality of PUCCH transmissions are configured or indicated in the PUCCH transmission slot 850, the UE may perform PUCCH transmission at a PUCCH resource other than the resource indicated through the PUCCH resource indicator of DCI.

In a 5G communication system, in order to dynamically change a downlink signal transmission interval and an uplink signal transmission interval in a time division duplex (TDD) system, whether each OFDM symbol constituting one slot is a downlink symbol, an uplink symbol, or a flexible symbol may be indicated by a slot format indicator (SFI). Here, a symbol indicated as a flexible symbol means a symbol that is not both a downlink symbol and an uplink symbol or that may be changed to a downlink or uplink symbol by UE-specific control information or scheduling information. In this case, the flexible symbol may include a gap guard required in a process of switching from a downlink to an uplink.

The slot format indicator may be simultaneously transmitted to a plurality of UEs through a UE group (or cell) common control channel. In other words, the slot format indicator may be transmitted to a UE unique identifier (cell-RNTI (C-RNTI)) and other identifiers (e.g., SFI-RNTI) through a CRC scrambled PDCCH. In various embodiments, the slot format indicator may include information on the N number of slots, and a value of N may be an integer or a natural value greater than 0, or may be a value configured by the base station to the UE through a higher signal among a set of predefined possible values such as 1, 2, 5, 10, and 20. Further, the size of the slot format indicator information may be configured by the base station to the UE through a higher signal. [Table 3] illustrates an example of a slot format that the slot format indicator may indicate.

TABLE 3

| Format | Symbol number (or index) within one slot | | | | | | | | | | | | | |
|---|---|---|---|---|---|---|---|---|---|---|---|---|---|---|
| | 0 | 1 | 2 | 3 | 4 | 5 | 16 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |

TABLE 3-continued

| Format | \multicolumn{14}{c}{Symbol number (or index) within one slot} |
| --- | --- | --- | --- | --- | --- | --- | --- | --- | --- | --- | --- | --- | --- | --- |
|  | 0 | 1 | 2 | 3 | 4 | 5 | 16 | 7 | 8 | 9 | 10 | 11 | 12 | 13 |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | F | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on TDD-UL-DL-ConfigurationCommon, or TDD-UL-DL-ConfigDedicated and, if any, on detected DCI formats} |

In Table 3, D means a downlink, U means an uplink, and F means a flexible symbol. According to Table 3, the total number of supportable slot formats is 256. The maximum size of a slot format indicator information bit in the current NR system is 128 bits, and the slot format indicator information bit is a value that the base station may configure to the UE through a higher signal (e.g., dci-PayloadSize). In this case, a cell operating in an unlicensed band may configure and indicate additional slot formats, as illustrated in Table 4 by introducing one or more additional slot formats or modifying at least one of the existing slot formats. Table 4 illustrates an example of a slot format in which one slot is configured with an uplink (U) and a flexible symbol F.

TABLE 4

| Format | \multicolumn{14}{c}{Symbol number (or index) within one slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

In various embodiments, slot format indicator information may include a slot format for a plurality of serving cells, and a slot format for each serving cell may be distinguished through a serving cell ID. Further, for each serving cell, a combination of slot format indicators for one or more slots may be included. For example, in case that a size of a slot format indicator information bit is 3 bits and the slot format indicator information is configured with a slot format indicator for one serving cell, slot format indicator information of 3 bits may be one of total 8 slot format indicators or a combination of slot format indicators (hereinafter, slot format indicator), and the base station may indicate one slot format indicator of 8 slot format indicators through UE group common control information (group common DCI) (hereinafter, slot format indicator information).

In various embodiments, at least one slot format indicator of 8 slot format indicators may be configured with a slot format indicator for a plurality of slots. For example, Table 5 illustrates an example of 3-bit slot format indicator information configured with the slot format of Table 4. Five (slot format combination ID 0, 1, 2, 3, and 4) of the slot format indicator information are slot format indicators for one slot, and the remaining three are information on slot format indicator (slot format combination ID 5, 6, 7) for four slots, which may be sequentially applied to the four slots.

TABLE 5

| Slot format combination ID | Slot Formats |
|---|---|
| 0 | 0 |
| 1 | 1 |
| 2 | 2 |
| 3 | 19 |
| 4 | 9 |
| 5 | 0000 |
| 6 | 1111 |
| 7 | 2222 |

The UE may receive configuration information for the PDCCH that should detect slot format indicator information through a higher signal, and detect a slot format indicator according to a configuration. For example, the UE may receive a configuration of at least one of a CORESET configuration that should detect slot format indicator information, a search space configuration, RNTI information used for CRC scrambling of DCI in which slot format indicator information is transmitted, or a period and offset information of a search space through a higher signal.

The UE supporting carrier aggregation (CA) may perform data transmission and reception through a plurality of carriers from the base station. In this case, the UE receives transmission power information from the base station and transmits uplink information based on the transmission power information. The UE uses a power amplifier in order to control the transmission power magnitude, and the implementation of the power amplifier may be different for each UE. For example, there may be a UE in which a power amplifier is designed for each carrier, and there may be a UE in which only one power amplifier is designed regardless of a carrier. In case of a UE in which a power amplifier is designed for each carrier, the base station may perform independent power control for each carrier to a UE supporting CA.

Figure 9A:
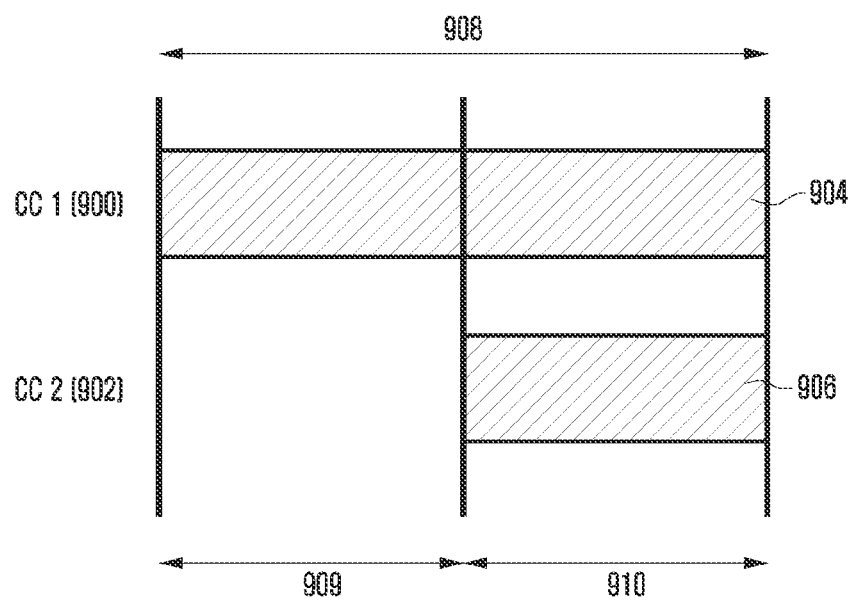
FIG. 9A illustrates a situation in which an uplink resource is allocated for each cell in a carrier aggregation (CA) environment.

FIG. 9A is a diagram illustrating a situation in which an uplink resource is allocated for each cell in a carrier aggregation (CA) environment.

For example, it may be possible to schedule uplink information 904 in a transmission interval 908 of a CC1, 900 in FIG. 9A, and to schedule another uplink information 906 in a transmission interval 910 of a CC2, 902. CC stands for a component carrier, which may be replaced by the term of a constituent carrier or an individual carrier. The transmission interval may be part of a symbol (group) unit, a slot (group) unit, a subframe (group) unit, or a combination thereof. Assuming that a transmission power magnitude allocated to transmission of the uplink information 904 is P1, and a transmission power magnitude allocated to transmission of the uplink information 906 is P2, the UE has a transmission power magnitude of P1 in the first transmission interval 909, and has a transmission power magnitude of P1+P2 in the second transmission interval 910. However, in case of a UE that has designed only one power amplifier regardless of the carrier, the base station cannot perform independent power control for each carrier to the UE supporting CA. It is because, in case that the power amplifier is shared for a carrier, the transmission power change generated in a particular carrier causes a change in the analog gain of the corresponding power amplifier, which may cause a decrease in a channel estimation error or uplink transfer rate of the other carrier. Therefore, it is difficult to support scheduling illustrated in FIG. 9A, and a situation in which such a problem may occur only in case that each carrier in CA is an intra-band CA adjacent from the viewpoint of frequency. For reference, a case that each carrier in the CA is separated (or not adjacent) from the viewpoint of frequency is referred to as inter-band CA.

Figure 9B:
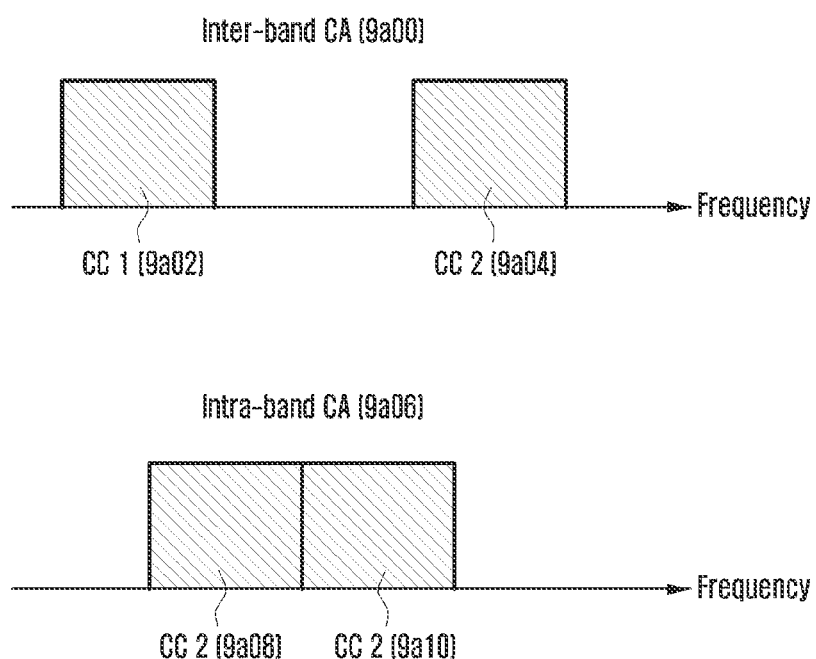
FIG. 9B illustrates various carrier aggregation (CA) types.

FIG. 9B is a diagram illustrating various carrier aggregation (CA) types. FIG. 9B illustrates an example of inter-band CA and intra-band CA, and in an inter-band CA, 9a00, a CC1, 9a02 and a CC2, 9a04 are spaced apart from the viewpoint of frequency resources, and in an intra-band CA, 9a06, a CC1, 9a08 and a CC, 9a10 are adjacent from the viewpoint of frequency resources. In summary, for each carrier for intra-band CA or intra-band EN-DC or FDM-based ULSUL (NR SUL with UL sharing from the UE perspective), in case that uplink transmissions having a non-aligned start time point, end time point, or hop boundary time point overlap, the UE may receive a phase discontinuity impact, and the UE may report, to the base station, a UE capability for a phase discontinuity impact. For a UE that does not report a phase discontinuity impact, the base station may determine that there is no phase discontinuity impact. Therefore, the base station should always allocate an uplink information transmission resource having the same transmission length for each carrier to the UE that has reported a UE capability for phase discontinuity impact. As described with reference to FIG. 9A, an UE that has reported a UE capability for a phase discontinuity impact cannot perform uplink information transmission having different transmission lengths for each carrier. Even if the UE performs uplink information transmission, a base station reception decoding performance is highly likely to deteriorate. In the intra-band EN-DC, E means LTE as E-UTRA, N means 5G as new radio (NR), and DC stands for dual connectivity and means that different RATs are connected to one UE. Phase discontinuity means, in other words, that transmission power sequentially changes, and means that P1 in the first transmission interval 909 is changed to P1+P2 in the second transmission interval 910 in FIG. 9A. However, x μs (microsec, microseconds) of an interval switched from the first transmission interval 909 to the second transmission interval 910 is not considered in the phase discontinuity, and a value of x may be an arbitrary integer value or 25. In other words, when at least one of start time points, end time points, or hopping boundary time points of PUSCHs (or PUCCHs or PRACHs) to be transmitted in each carrier do not absolutely match from the viewpoint of time resources, and when the difference therebetween is within up to x µs or 25 µs, it is not phase discontinuity, and when the difference therebetween exceeds x µs or 25 µs, it is referred to as phase discontinuity. Conversely, in case that an uplink resource in which the UE transmits to intra-band cells indicates the same transmission time point, end time point, and hopping, it may be assumed that there is no phase discontinuity impact as follows. A PRACH stands for a physical random access channel.

FIGS. 10 to 14 described below assume a UE that has reported a UE capability for a phase discontinuity impact, define a problem that may occur in the UE, and propose solutions thereto.

Figure 10:
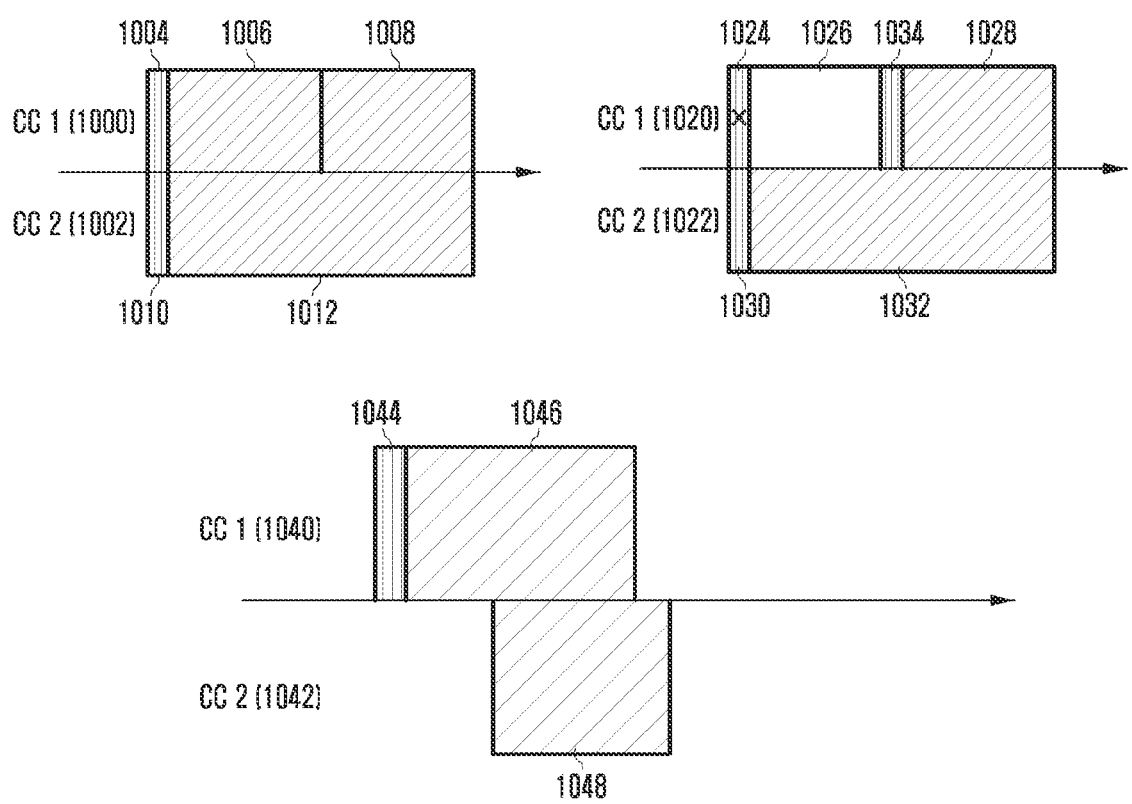
FIG. 10 is a diagram illustrating uplink channel transmission according to whether LBT of a terminal is successful according to an embodiment.

FIG. 10 is a diagram illustrating uplink channel transmission according to whether LBT of a UE is successful according to an embodiment.

In an unlicensed band, before transmitting an uplink channel, the UE determines through reception power whether the channel is occupied in advance by another UE through LBT, and in case that a power value received during LBT is a predetermined threshold or less (or LBT success), the UE transmits information on an uplink resource scheduled from the base station. Conversely, in case that the power value is a predetermined threshold or more (or LBT failure), the UE does not perform uplink information transmission in a scheduling uplink resource. The unlicensed band may be used instead of the term shared spectrum channel access. FIG. 10 illustrates a situation in which a UE receives scheduling of a PUSCH for each of two carriers and transmits uplink information. In a situation in which the base station schedules a PUSCH 1006 and PUSCH 1008 to one UE in a CC1, 1000, and schedules a PUSCH 1012 in a CC2, 1002, in case that transmission power allocated to the PUSCH 1006 and the PUSCH 1008 is the same, the UE that has reported the UE capability for a phase discontinuity impact in an intra-band CA situation may transmit all of the scheduled PUSCHs 1006, 1008, and 1012 at the CC1 and CC2. However, in the unlicensed band, when LBTs 1004 and 1010 should succeed, the UE may transmit the scheduled PUSCH; thus, in case that LBT fails in at least one carrier of the CC1 and the CC2, a situation may occur in which the UE transmits PUSCHs with phase discontinuity. For example, in FIG. 10, in case that LBT 1024 fails at a CC1, 1020, the UE does not transmit a scheduled PUSCH 1026, and transmission of a next scheduled PUSCH 1028 is determined by additional LBT 1034. In other words, in case that the UE succeeds in the LBT 1024, the UE may transmit both the PUSCH 1026 and the PUSCH 1028 without necessity to perform additional LBT 1034. Because there is no gap between the PUSCH 1026 and the PUSCH 1028 transmission interval, it is not necessary to perform additional LBT. However, in case that the UE fails to perform the LBT 1024, the UE may perform additional LBT 1034, transmission of the PUSCH 1028 may be determined according to whether the additional LBT 1034 is successful. Such a procedure is applicable to the UE that does not report a phase discontinuity impact, even in one cell or a plurality of cells. However, a UE that has reported an UE capability for a phase discontinuity impact should consider when LTB is successful in intra-band CC1 and CC2. As illustrated in FIG. 10, in case that the UE that has reported a UE capability for the phase discontinuity impact in the intra-band CA situation fails the LBT 1024 in the CC1, and succeeds the LBT 1030 in the CC2, the UE does not transmit a PUSCH 1026 but transmits a PUSCH 1032. In this case, for the scheduled other PUSCH 1028, because the UE has a phase discontinuity impact, the UE does not perform additional LBT 1034 and does not perform transmission of the corresponding PUSCH 1028. However, in case that both the LBT 1024 of the CC1 and the LBT 1030 of the CC2 fail, because the UE has no phase discontinuity impact, the UE may perform additional LBT 1034 and transmit the PUSCH 1028 according to the result. In an intra-band CA or intra-band EN-DC situation, in case that the UE reports a UE capability for the phase discontinuity effect, the UE transmits a PUSCH in a carrier other than a carrier a, and in case that the UE receives scheduling of a PUSCH partially overlapped with the corresponding PUSCH in carrier a, the UE does not sense LBT channel in the carrier a, and does not transmit the corresponding scheduled PUSCH. That is, before performing LBT for transmitting a PUSCH scheduled in a specific carrier, the UE determines whether a PUSCH is already being transmitted in another carrier, and in case that there is a PUSCH that is already being transmitted in another carrier, the UE does not perform LBT and transmission of the corresponding PUSCH, and in case that there is no PUSCH being transmitted on another carrier, the UE performs LBT, and in case that LBT is successful, the UE transmits the PUSCH. FIG. 10 illustrates a situation in which a UE that has reported an UE capability for a phase discontinuity impact receives scheduling of a PUSCH 1046 in a CC1, 1040 and receives scheduling of another PUSCH 1048 in a CC2, 1042. The PUSCH 1046 performs LBT and whether to transmit the PUSCH is determined according to the result, and the PUSCH 1048 is always transmitted without performing LBT. Even if CC2 is in a licensed band or an unlicensed band, the operation will be possible in case that it is determined to a mode of transmitting the PUSCH without LBT according to scheduling of the base station. That is, in the unlicensed band, the UE does not always perform LBT, but may transmit a PUSCH without LBT according to the instruction of the base station. In case that the UE transmits LBT 1044, the UE cannot transmit both the PUSCH 1046 and the PUSCH 1048, and should transmit only one of the PUSCH 1046 and the PUSCH 1048. The UE may transmit the PUSCH 1046 or cancel transmission of the PUSCH 1046 and transmit the PUSCH 1048. For example, in case that the PUSCH 1046 is eMBB data and the PUSCH 1048 is URLLC data, the UE should prioritize URLLC data; thus, the UE may prioritize the PUSCH 1048 scheduled without LBT, and perform an operation that does not perform transmission of the PUSCH 1046 scheduled with LBT. Although the above description is limited to a PUSCH, it is sufficiently applicable to transmission of other uplink channels such as a PUCCH, PRACH, and SRS. In FIG. 10, both the CC1 and the CC2 are basically assumed to be unlicensed bands, but it is sufficiently applicable even in case that at least one of the CC1 and the CC2 is in a licensed band. For example, in case that both the CC1, 1040 and the CC2, 1042 are in a licensed band, the UE may transmit immediately the scheduled PUSCH 1046 and PUSCH 1048 without performing the LBT 1044. However, in case that the UE reports a UE capability for a phase discontinuity impact, the UE may not transmit the PUSCH 1046 and the PUSCH 1048 having different start symbols and end symbols. Therefore, the UE will drop one of two PUSCHs in advance, and the dropping condition may make it possible for the UE to drop a PUSCH scheduled by DCI including a field having a low priority value. A field including the corresponding priority information may be indicated by information such as a priority indicator of the DCI field, and the corresponding value may have a value of 0 or 1. A larger corresponding value may mean that the priority is higher. DCI without a corresponding field (e.g., DCI format 0_1) may mean scheduling a PUSCH that always has a low priority (i.e., a priority value of 0). Alternatively, in case that a DCI format 0_1 or DCI format 0_2 is configured, the UE may distinguish priorities by the DCI format itself, and it may be possible to always consider a priority value of the DCI format 0_2 as 1 and a priority value of the DCI format 0_1 as 0.

A UE configured or indicated to transmit an uplink signal or channel (e.g., at least one of a PUCCH, PUSCH, SRS, or PRACH) through an unlicensed band should perform a channel access procedure before a first symbol in which an uplink signal or channel transmission is configured or indicated. In this case, according to a magnitude of a gap between the uplink signal or channel transmission start time point configured or indicated by the UE and the uplink/downlink signal or channel end time point before the start time point, the UE may perform a type 2 or type 3 channel access procedure and transmit a configured or indicated uplink signal or channel. For example, in case that the magnitude of the gap between the uplink signal or channel transmission start time point configured or indicated by the UE and the uplink/downlink signal or channel end time point before the start time point is 25 µs, the UE may perform the type 2 channel access procedure for 25 µs. For another example, in case that the magnitude of the gap between the uplink signal or channel transmission start time point configured or indicated by the UE and the upper/downlink signal or channel end time point before the start time point is equal to or smaller than 16 µs, the UE may perform the type 2 channel access procedure for 16 µs or perform the type 3 channel access procedure.

Further, in a general LTE or NR system, because transmission of an uplink/downlink signal or channel is performed in units of symbols, a case in which the magnitude of the gap becomes larger than 25 µs may occur. For example, in case that uplink/downlink communication is performed at 15 kHz subcarrier spacing, a length of one symbol is approximately 72 µs, which may be larger than a magnitude of a gap guard for performing the type 2 or type 3 channel access procedure. Accordingly, the base station or the UE may transmit an uplink/downlink signal or channel in a time within a symbol (e.g., symbol length—from a required gap length to a symbol end time) in order to guarantee the gap of a predetermined time.

A signal or channel transmitted at some time of the symbol may be an extended cyclic prefix (CP) for an uplink transmission start symbol configured or indicated from the base station by the UE, a signal or channel in which all or part of the transmission start symbol is copied, or a signal or channel in which all or part of the transmission start symbol is cyclic prefix extended. Hereinafter, for convenience of description, in the disclosure, an expression of a cyclic prefix extension or CP extension is used. The cyclic extended signal or channel may be transmitted in one or more symbols. For example, in a symbol 1-1 immediately before an uplink transmission start symbol 1 configured or indicated to uplink transmission, the entire uplink transmission start symbol 1 is cyclically extended and transmitted, and in a previous symbol 1-2, a cyclically extended signal or channel of the uplink transmission start symbol 1 (or copied symbol 1-1) configured and indicated to uplink transmission may be also transmitted. In the symbol 1-1 immediately before the uplink transmission start symbol 1 configured or indicated to uplink transmission, cyclic extension and transmission of the entire uplink transmission start symbol 1 may mean that the uplink transmission start symbol 1 is copied and transmitted in the symbol 1-1 or that the uplink transmission start symbol 1 is transmitted or retransmitted in the symbol 1-1.

An example of cyclic expansion is described as follows. In case that a first OFDM symbol (1) allocated to the configured or indicated uplink signal or channel transmission is cyclically extended, a time continuous signal of a time interval $$T^{\mu}_{symb,1} - T_{ext} \le t < T^{\mu}_{symb,l}$$

before the first symbol may be expressed as illustrated in Equation 2.

$$s^{(p,\mu)}_{l-1} = -s^{(p,\mu)}_{l}(t - N^{\mu}_{CP,l}T_c) \qquad \text{[Equation 2]}$$
$$T^{\mu}_{symb,l} - T_{ext} \le t < T^{\mu}_{symb,l}$$
$$T^{\mu}_{symb,l} = (N^{\mu}_{u} - N^{\mu}_{CP,l})T_c$$

where $$s^{(p,\mu)}_{l}$$

is a time continuous signal of an antenna port p and subcarrier spacing µ in the OFDM symbol 1. $T_{ext}$ is the same as that illustrated in Table 6, and $T_{TA}$ may be timing advance (TA) applied during uplink transmission configured or indicated by the UE. Equation 2 is only an example of cyclic expansion and is not limited to the above equation. In Table 6, $C_2$ and $C_3$ are integer values including at least 1 and 2, and may be values defined in advance between the base station and the UE or configured by the UE through a higher signal. In this case, values of C2 and C3 may be defined as $C_2$=ceiling (16 µs+$T_{TA}$/$T_{symb,l}^{\mu}$) and $C_3$=ceiling (25 µs+$T_{TA}$/$T_{symb,l}^{\mu}$) In this case, Table 6 is an example representing a cyclic expansion interval and is not limited thereto.

TABLE 6

| Index | µ = 0 | µ = 1 | µ = 2 |
|---|---|---|---|
| 0 | 0 | 0 | 0 |
| 1 | $T^{\mu}_{symb,l} - 25 \cdot 10^{-6}$ | $T^{\mu}_{symb,l} - 25 \cdot 10^{-6}$ | $2T^{\mu}_{symb,l} - 25 \cdot 10^{-6}$ |
| 2 | $C_2 T^{\mu}_{symb,l} - 16 \cdot 10^{-6} - T_{TA}$ | $C_2 T^{\mu}_{symb,l} - 16 \cdot 10^{-6} - T_{TA}$ | $C_2 T^{\mu}_{symb,l} - 16 \cdot 10^{-6} - T_{TA}$ |
| 3 | $C_3 T^{\mu}_{symb,l} - 25 \cdot 10^{-6} - T_{TA}$ | $C_3 T^{\mu}_{symb,l} - 25 \cdot 10^{-6} - T_{TA}$ | $C_3 T^{\mu}_{symb,l} - 25 \cdot 10^{-6} - T_{TA}$ |

In the following description, a method of operating a UE that has reported a UE capability for a phase discontinuity impact in consideration of CP extension will be described.

Figure 11:
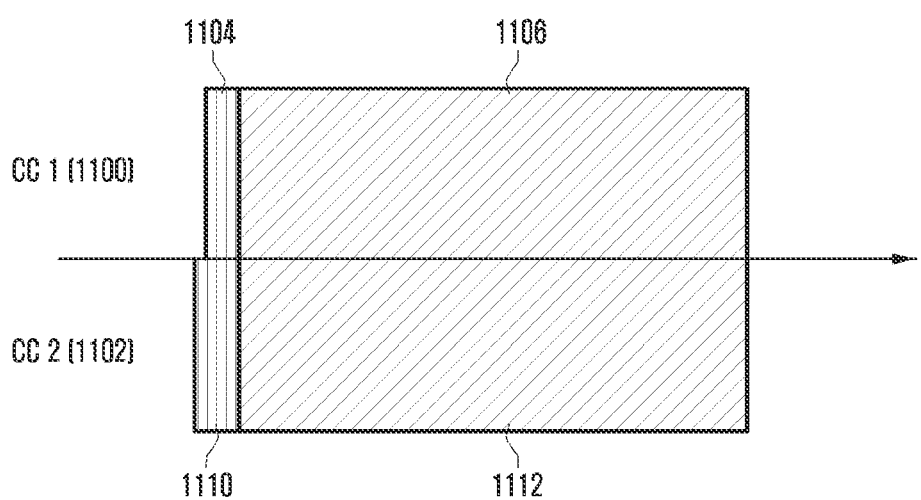
FIG. 11 is a diagram illustrating uplink channel transmission of a terminal according to an embodiment.

FIG. 11 is a diagram illustrating uplink channel transmission of a UE according to an embodiment. The UE may be instructed with different cyclic prefix (CP) extension values for PUSCHs 1106 and 1112 scheduled for each carrier. The reason for providing CP extension is to reduce collisions that may occur during channel access between UEs in an unlicensed band. Further, a gap period necessary for switching from a downlink to an uplink occurs, and by reducing the gap period, in case that the gap period is a predetermined value or less, the UE may transmit a PUSCH without separate LBT, thereby increasing the transmission/reception success probability. By adding the above-indicated CP extension to a first symbol of the PUSCH to be transmitted, the UE transmits the PUSCH. For example, in FIG. 11, the UE adds indicated CP extension 1104 to the scheduled PUSCH 1106 in a CC1, 1100 to transmit uplink information. For example, CP extension may be defined, as illustrated in Table 7. Table 7 is the content described in 3GPP standard TS38.211 v16.1.0.

TABLE 7

The time-continuous signal $s_l^{(p,\mu)}(t)$ on antenna port p and subcarrier spacing configuration $\mu$ for OFDM symbol $l \in \{0, 1, \ldots, N_{slot}^{subframe,\mu} N_{symb}^{slot} - 1\}$ in a subframe for any physical channel or signal except PRACH is defined by $$s_l^{(p,\mu)}(t) = \begin{cases} \bar{s}_l^{(p,\mu)}(t) & t_{start,l}^\mu \leq t < t_{start,l}^\mu + T_{symb,l}^\mu \\ 0 & \text{otherwise} \end{cases}$$

$$\bar{s}_l^{(p,\mu)}(t) = \sum_{k=0}^{N_{grid,x}^{size,\mu} N_{sc}^{RB}-1} a_{k,l}^{(p,\mu)} e^{j2\pi(k+k_0^\mu - N_{grid,x}^{size,\mu} N_{sc}^{RB}/2)\Delta f(t - N_{CP,l}^\mu T_c - t_{start,l}^\mu)}$$

$$k_0^\mu = (N_{grid,x}^{start,\mu} + N_{grid,x}^{size,\mu}/2)N_{sc}^{RB} - (N_{grid,x}^{start,\mu_0} + N_{grid,x}^{size,\mu_0}/2)N_{sc}^{RB} 2^{\mu_0-\mu}$$

$$T_{symb,l}^\mu = (N_u^\mu + N_{CP,l}^\mu)T_c$$

where t = 0 at the start of the subframe, $$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ and } l \neq 7 \cdot 2^\mu \end{cases}$$

and
  $\Delta f$ is given by clause 4.2;
  $\mu$ is the subcarrier spacing configuration;
  $\mu_0$ is the largest $\mu$ value among the subcarrier spacing configurations by the higher-layer parameter scs-SpecificCarrierList.

In case of cyclic prefix extension of the first OFDM symbol l allocated for PUSCH or PUCCH transmission, the time−continuous signal $s_{ext}^{(p,\mu)}(t)$ for the interval $t_{start,l}^\mu - T_{ext} \leq t < t_{start,l}^\mu$ preceding the first OFDM symbol for PUSCH or PUCCH is given by $$s_{ext}^{(p,\mu)}(t) = \bar{s}_l^{(p,\mu)}(t)$$

where t < 0 refers to the signal in the previous subframe and
  for dynamically scheduled PUSCH and PUCCH transmissions $$T_{ext} = \min(\max(T'_{ext}, 0), T_{symb,(l-1) \bmod 7 \cdot 2^\mu}^\mu)$$

$$T'_{ext} = \sum_{k=1}^{C_i} T_{symb,(l-k) \bmod 7 \cdot 2^\mu}^\mu - \Delta_i$$

where $\Delta_i$ is given by TABLE 5.3.1-1 with $C_1 = 1$ for $\mu \in \{0,1\}$, $C_1 = 2$ for $\mu = 2$, and $C_2$ and $C_3$ given by the higher-layer parameters cp-ExtensionC2-r16 and cp-ExtensionC3-r16, respectively, and $T_{TA}$ given by clause 4.3.1. For contention-based random access, or in absence of higher-layer configuration of $C_2$ and $C_3$, the value of $C_i$ shall be set to the largest integer fulfilling $T'_{ext} < T_{symb,(l-1) \bmod 7 \cdot 2^\mu}^\mu$ for each of the values of $i \in \{2, 3\}$.
  for a PUSCH transmission using configured grant, $T_{ext}$ is given by the procedure in [6, TS 38.214].

The starting position of OFDM symbol l for subcarrier spacing configuration $\mu$ in a subframe is given by $$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases}$$

TABLE 5.3.1-1

The variables $C_i$ and $\Delta_i$ for cyclic prefix extension.

| $T_{ext}$ index i | $C_i$ | $\Delta_i$ |
|---|---|---|
| 0 | — | — |
| 1 | $C_1$ | $25 \cdot 10^{-6}$ |
| 2 | $C_2$ | $16 \cdot 10^{-6} + T_{TA}$ |
| 3 | $C_3$ | $25 \cdot 10^{-6} + T_{TA}$ |

The UE may be instructed, as illustrated in Table 8 for CP extension and LBT type for PUSCH or PUCCH transmission through a specific field in DL DCI or UL DCI scheduled from the base station in an unlicensed band.

TABLE 8

| Index | Channel Access type 1 | CP extension value |
|---|---|---|
| 1 | Type 1 | 0 |
| 2 | Type 2 | C2*symbol length - 16 μs - TA |
| ... | ... | ... |

As illustrated in Table 8, the UE may simultaneously receive a configuration of CP extension and a channel access type for LBT through a specific value. The channel access type may be a value of one of types 1 to 3, as described above, and CP extension may have one value of 0, C2*symbol length–16 μs–TA, 1*symbol length–25 μs, or C3*symbol length–25 μs–TA or may indicate one of values indicated in "Table 5.3.1-1" in Table 7. The above-described C2 and C3 values may be configured with a higher signal, and TA is an abbreviation of timing advance, and is a value indicating the timing at which the UE adjusts an uplink transmission signal in order for the base station and the UE to align an uplink frame. Accordingly, the corresponding TA value is an accumulation TA value or an absolute TA value and is a value configured by the UE by a higher signal received from the base station. The base station may indicate a different TA value for each cell, and the UE may transmit uplink information for each cell with different cumulative TA or absolute TA values, but in an intra-band EN-DC situation, in case that the UE reports a capability supporting only the common TA for each cell, when a TA indication value of a timing advanced group (TAG) of the MCG is different from a TA indication value of a secondary cell group (SCG), the UE commonly applies the TA indication value of the TAG of the MCG to the cell of the SCG.

Before performing the PUSCH scheduled by Table 8, the UE performs LBT or determines whether to perform LBT for how long when LBT is performed, and determines whether to add how much CP extension in front of the PUSCH and whether to additionally transmit when transmitting the PUSCH, and transmits the PUSCH. FIG. 11 illustrates a situation in which PUSCHs 1106 and 1112 having the same length are scheduled in two carriers CC1, 1100 and CC2, 1102, respectively. In case that all CP extensions are the same, the UE will transmit the scheduled PUSCH 1106 or PUSCH 1112 according to whether LBT is successful. In case that CP extensions are different, due to phase discontinuity of the UE, there is a possibility that performance degradation may occur in the PUSCHs 1106 and 1112 scheduled by the base station. Therefore, it is necessary to always equally configure CP extension so as to prevent such a problem from occurring, or to schedule the CP extension difference to be within a predetermined threshold (e.g., 25 μs), in case that CP extensions of PUSCHs scheduled for each carrier are not the same or the difference in CP extension is greater than or equal to a predetermined threshold, the UE may perform an arbitrary operation for the corresponding scheduled PUSCHs. The arbitrary operation may mean transmission cancellation of all scheduled PUSCHs or transmission of only one of two PUSCHs. Alternatively, in case that all LBT is performed by UE implementation, the LBT may be basically performed for all cells, and only a PUSCH of a cell in which LBT is successful may be transmitted. Alternatively, by giving a priority to a carrier that transmits only a PUSCH without LBT, the UE may transmit the corresponding PUSCH. Alternatively, as illustrated in FIG. 11, in case that lengths of the CP extensions 1104 and 1110 indicated for each carrier are not the same or that the difference between the CP extensions exceeds a predetermined threshold value, the UE may apply at least one of the following methods or some combinations of the following methods.

Method 11-1: The largest CP extension of two CP extensions is applied in common to all cells. For example, in case that the CP extension 1110 is greater than the CP extension 1104, the UE changes the pre-scheduled CP extension 1104 to the CP extension 1110 to transmit the PUSCHs 1106 and 1112.

Method 11-2: The smallest CP extension of two CP extensions is applied in common to all cells. For example, in case that the CP extension 1104 is smaller than the CP extension 1110, the UE changes the pre-scheduled CP extension 1110 to the CP extension 1104 to transmit the PUSCHs 1106 and 1112.

Method 11-3: Indicated CP extension is commonly applied to a primary cell (Pcell) or a master cell group (MCG). For example, in case that the CC1, 1100 is a Pcell and the CC2, 1102 is a secondary cell (Scell), the UE considers CP extension 1104 indicated in the CC1, 1100 even in the CC2. Accordingly, the UE changes the CP extension 1110 of the CC2, 1102 to the CP extension 1104 of the CC1, 1100 to transmit the PUSCHs 1106 and 1112.

Method 11-4: The UE transmits data only for the PUSCH having the largest or smallest channel access priority class (CAPC) value among carriers.

The above-described methods are applicable in a situation determined to transmit both the PUSCHs 1106 and 1112 in the CC1 and CC2. Such a situation may be a case indicated to transmit the PUSCH without LBT or a case of transmitting a PUSCH after successful LBT. In case that it is necessary to perform LBT for all PUSCHs 1106 and 1112 scheduled at the CC1 and CC2, and in case that the UE succeeds in LBT in only one thereof, the above-described method may not be applied to the UE. That is, in case of transmitting only one PUSCH, the UE may apply the CP extension indicated in the control information for scheduling the corresponding PUSCH. In FIG. 11, an example is limited to a PUSCH, but it may be applied to a PUCCH, SRS, or PRACH in addition to the PUSCH.

Figure 12:
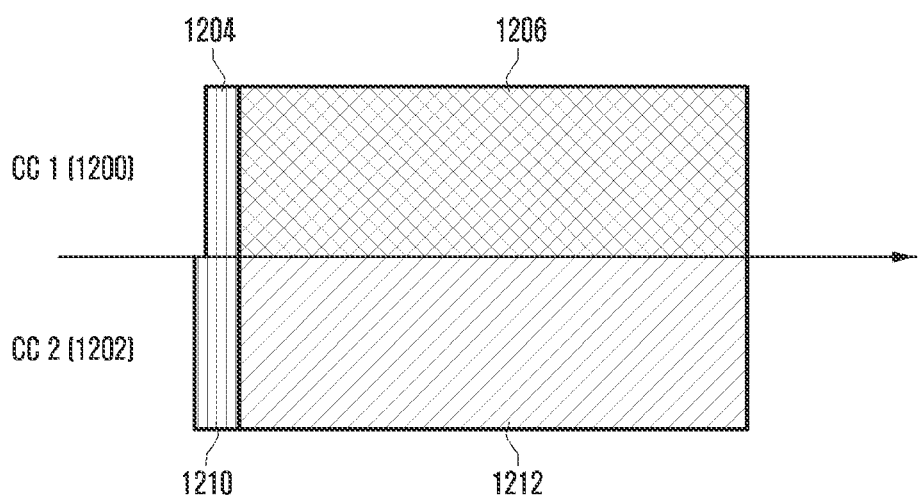
FIG. 12 is a diagram illustrating uplink channel transmission of the terminal according to an embodiment.

FIG. 12 is a diagram illustrating uplink channel transmission of a UE according to an embodiment. A situation in FIG. 12 is similar to that of FIG. 11, but one of two carriers is a configured grant PUSCH resource (i.e., a PUSCH resource periodically configured without scheduling DCI, autonomous UL transmission, or grant-free uplink transmission), and the other one is a PUSCH resource scheduled by DCI (or a dynamic grant PUSCH or a PUSCH provided by a PDCCH). CP extension applied to the configured grant PUSCH may have different values according to the following conditions.

Condition 12-1: a PUSCH resource exists in a COT and uses all frequencies in the PUSCH Conditions 12-2: a PUSCH resource exists within a COT and uses some frequency within the PUSCH Condition 12-3: a PUSCH resource exists outside a COT and uses all frequencies within the PUSCH Condition 12-4: a PUSCH resource exists outside a COT and uses some frequencies within the PUSCH In particular, in case of the above conditions 12-1 and 12-3, the UE arbitrarily determines CP extension to one of CP extension candidate lists configured in advance by a higher signal. However, in case of the above conditions 12-2 and 12-4, the UE uses one CP extension configured in advance by a higher signal.

Therefore, in FIG. 11, because the base station may individually indicate CP extension for each carrier, there was a possibility to equally configure CP extension, but in FIG. 12, in a specific situation, the base station cannot guarantee to always equally configure CP extension. For example, in case that the base station allocates a configured grant PUSCH 1206 resource without DCI scheduling in a CC 1, 1200, and allocates a PUSCH 1212 resource by DCI scheduling in a CC 2, 1202, a length of CP extension 1204 for the PUSCH 1206 is selected by the UE as one of candidate lists configured by a higher signal in a random manner by a condition 12-1 or 12-3. However, the length of the CP extension 1210 for the PUSCH 1212 is selected as one value by scheduling DCI. Accordingly, in FIG. 12, a transmission interval and a start symbol and an end symbol or a hopping boundary time point of the PUSCH 1206 of the CC1 and the PUSCH 1212 of the CC2 may all be equally configured, but values of CP extension 1204 of the CC1 and the CP extension 1210 of the CC2 cannot always be configured to be the same. Accordingly, in case that CP extension 1204 and CP extension 1210 are not the same or a difference value between the two is greater than or equal to a predetermined threshold value (e.g., 25 μs), the UE may apply at least one of the following methods or a some combinations of the following methods.

Method 12-1: The largest CP extension among two CP extensions is commonly applied to all cells. For example, in case that the CP extension 1210 is larger than the CP extension 1204, the UE changes the previously scheduled CP extension 1204 to the CP extension 1210 and transmits the PUSCHs 1206 and 1212.

Method 12-2: The smallest CP extension among two CP extensions is commonly applied to all cells. For example, in case that the CP extension 1204 is smaller than the CP extension 1210, the UE changes the previously scheduled CP extension 1210 to the CP extension 1204 and transmits the PUSCHs 1206 and 1212.

Method 12-3: Indicated CP extension is commonly applied to a primary cell (Pcell) or a master cell group (MCG) or a dynamic grant scheduling PUSCH. For example, in case that the PUSCH 1206 of the CC1, 1200 is a configured grant PUSCH and that the PUSCH 1212 of the CC2, 1202 is a dynamic grant PUSCH, the UE changes and transmits the CP extension 1204 of the PUSCH 1206 to the CP extension 1210 of the PUSCH 1212.

Method 12-4: The UE transmits data only to a PUSCH having the largest or smallest channel access priority class (CAPC) value among carriers.

Method 12-5: Transmit a dynamic grant PUSCH without transmitting a configured grant PUSCH.

The above-described methods may be limitedly applicable to a case in which LBT is successful for all scheduled cells. For example, in case that only one carrier of the CC1 and the CC2 in FIG. 12 succeeds in LBT, the above methods are not considered, by applying a preconfigured or indicated CP extension, the UE may transmit a PUSCH. In FIG. 12, an example is limited to a PUSCH, but it may also be applied to a PUCCH, SRS, or PRACH in addition to the PUSCH.

Figure 13:
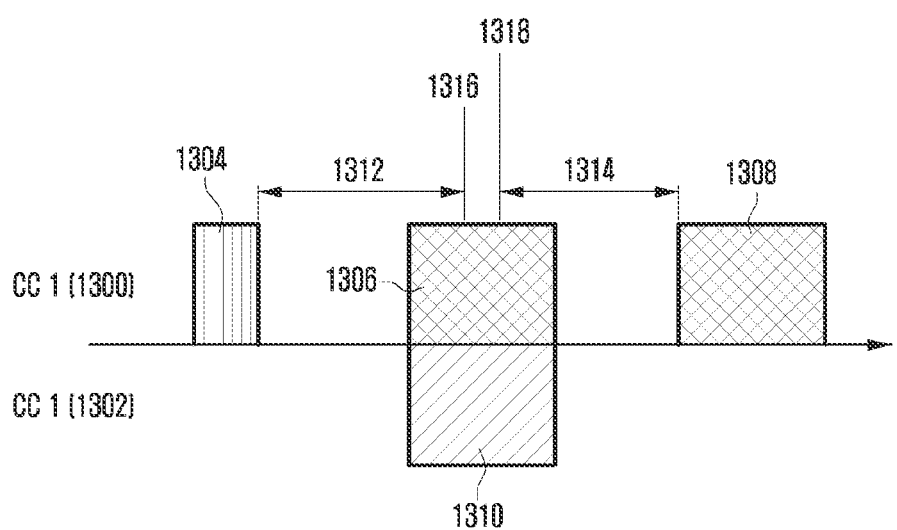
FIG. 13 is a diagram illustrating uplink channel transmission of a terminal according to an embodiment.

FIG. 13 is a diagram illustrating uplink channel transmission of a UE according to an embodiment. Similar to FIG. 12, FIG. 13 illustrates a situation in which a configured grant PUSCH 1306 is allocated in a CC1, 1300 and in which a dynamic grant PUSCH 1310 is allocated in a CC2, 1302. The configured grant PUSCH 1306, which is a resource periodically allocated in advance at the CC1, 1300, may cancel transmission by at least one of the following conditions.

Condition 13-1: Case that a dynamic grant PUSCH 1308 is scheduled after the configured grant PUSCH 1306 in the CC1, 1300, Condition 13-2: Case that a PDCCH 1304 including information (slot format indicator (SFI)) notifying that at least one of resources allocated to the configured grant PUSCH 1306 in the CC1, 1300 is a downlink symbol is transmitted and received before the configured PUSCH 1306, Condition 13-3: Case that a dynamic grant PUSCH 1308 is scheduled after the configured grant PUSCH 1306 in the CC1, 1300, and that the PDCCH 1304 including DCI scheduling the dynamic grant PUSCH 1308 is transmitted and received before the configured grant PUSCH 1306, According to the condition 13-1, if the UE is scheduled to transmit the dynamic PUSCH on a channel j by the PDCCH 1304 including the UL grant received for a channel i, and is transmitting an autonomous UL 1306 on the corresponding channel i, the UE should end transmission of the autonomous UL 1306 before at least a specific time period 1314 (e.g., 1 slot) based on the dynamic PUSCH 1308 transmission start scheduled by the UL grant. The channel i and the channel j may be different resources from the viewpoint of a frequency or time. According to a condition 13-2, after a specific time period 1312 after a last symbol of the PDCCH 1304 including SFI indicating that at least one symbol among resources allocated to the configured grant PUSCH 1306 is a downlink symbol, the UE should cancel transmission of the configured grant PUSCH 1306. According to the condition 13-3, the UE should cancel transmission of the configured grant PUSCH 1306 after a particular time period 1312 after the last symbol of the PDCCH 1304 including DCI indicating scheduling of the dynamic grant PUSCH 1308. In FIG. 13, the specific interval 1312, which is a time to consider transmission cancellation of the configured grant PUSCH 1306 from a transmission time point of the PDCCH 1304 may be a symbol unit, an absolute time unit, or a slot unit, and may have different values according to the subcarrier spacing and a UE capability. In FIG. 13, a particular interval 1314, which is a time to consider for transmission cancellation of the configured grant PUSCH 1306 from a transmission time point of the dynamic grant PUSCH 1308 may be a symbol unit, an absolute time unit, or a slot unit, and have different values according to the subcarrier spacing and a UE capability. According to the above-described situation, even if all of a length, a start time point, and an end time point of the transmission interval of the configured grant PUSCH 1306 allocated in the CC1, 1300 and the dynamic grant PUSCH 1310 allocated to the CC2, 1302 are the same, a situation may occur in which the configured grant PUSCH should cancel transmission during transmission by the above conditions. A UE that does not report a phase discontinuity impact capability may transmit all of the scheduled PUSCH 1310 in the dynamic grant PUSCH 1310 allocated to the CC2, 1302 regardless of whether transmission cancelation of the configured grant PUSCH 1306. However, in case that a UE that has reported a phase discontinuity impact capability performs transmission of the configured grant PUSCH 1306 up to a specific time point 1316 or 1318 at the CC1, 1300 and cancels the transmission after the specific time point 1316 or 1318, the UE may cancel transmission of the dynamic grant PUSCH 1310 at the CC2, 1302 at a time point that cancels transmission of the configured grant PUSCH at the CC2, 1302. Alternatively, in case that the configured grant PUSCH 1306 is canceled before transmission start in the CC1, 1300, the dynamic grant PUSCH 1310 has no effect on phase continuity in the CC1, 1302; thus, the UE may transmit the dynamic grant PUSCH 1310.

The above-described situation assumed in FIGS. 10 to 13 assumes and describes a case that all carriers are in an unlicensed band in mainly a CA situation, but it is sufficiently applicable even in case that a particular carrier or all carriers are in a licensed band. In the unlicensed band, the UE performed uplink information transmission in consideration of various types of LBT and CP extension, but in the licensed band, the UE performs uplink information transmission without necessity to consider LBT and CP extension for uplink information transmission. That is, in the license band, the UE transmits an uplink channel with no LBT and no CP extension. Further, although the above-described FIGS. 10 to 13 describe a phase discontinuity UE in mainly an intra-band CA situation, it will be possible to consider by sufficiently extending to the phase discontinuity UE in the intra-band EN-DC or FDM-based ULSUL.

Figure 14:
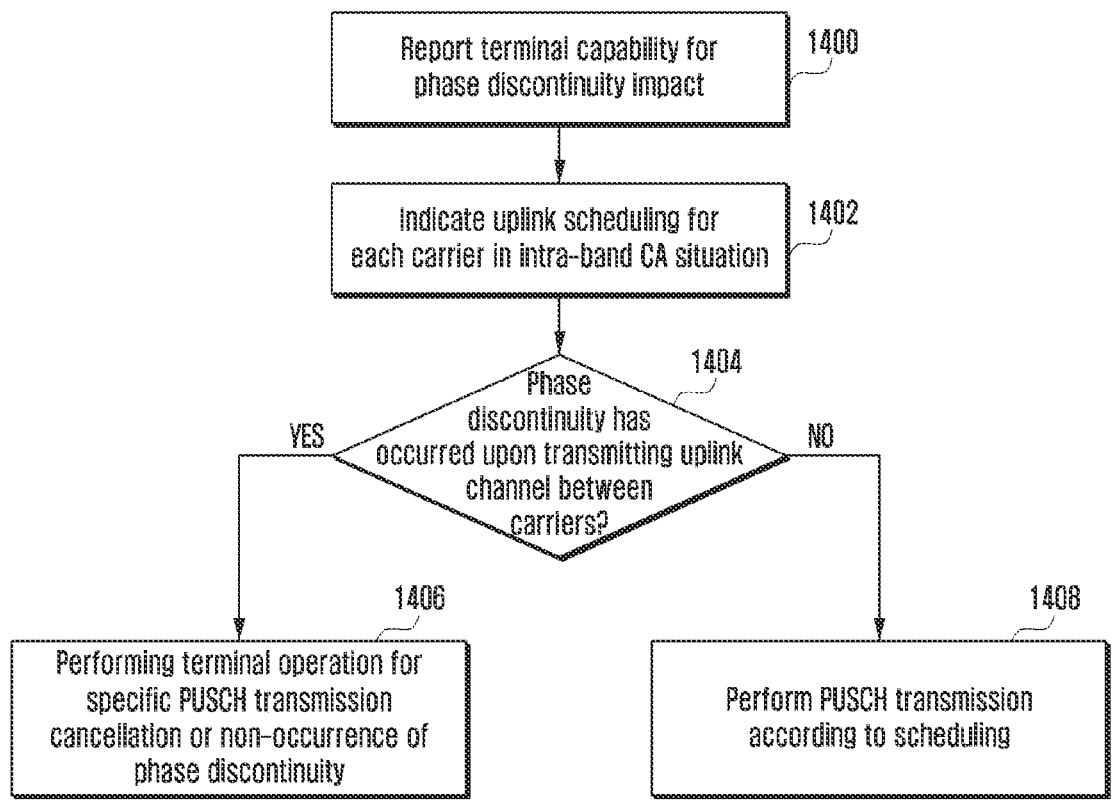
FIG. 14 is a block diagram illustrating a process in which a terminal that has reported a terminal capability for a phase discontinuity impact transmits uplink information in a multi-cell environment.

FIG. 14 is a block diagram illustrating a process in which a UE that reported a UE capability for a phase discontinuity impact transmits uplink information in a multi-cell environment.

After the UE accesses the base station, in case that the base station requests the UE to report a capability or the UE reports a capability to the base station without a separate request, the UE reports a UE capability for a phase discontinuity impact to the base station (1400). Thereafter, the UE may support CA, and in case that the base station operates intra-band CA or EN-DC, and the like, the base station may allocate resources for transmitting and receiving uplink information for each carrier to the UE. The uplink information may include uplink data information and uplink control information, and the corresponding information may be transmitted from the UE to the base station through a physical channel such as a PUSCH, a PUCC, or a PRACH (1402). In case that the UE receives resource information on uplink information transmission from the base station by a higher signal or L1 signal, the UE identifies whether phase discontinuity has occurred (1404). In case that phase discontinuity occurs, the UE performs uplink transmission by at least one of the methods described in FIGS. 10 to 13 or some combination thereof (1406). Alternatively, in case that phase discontinuity does not occur, the UE transmits information at the uplink resource indicated from the base station (1408). The UE transmits uplink information through an uplink channel, and for convenience of description, it is briefly described with the above-described uplink channel transmission or uplink information transmission expression.

Figure 15:
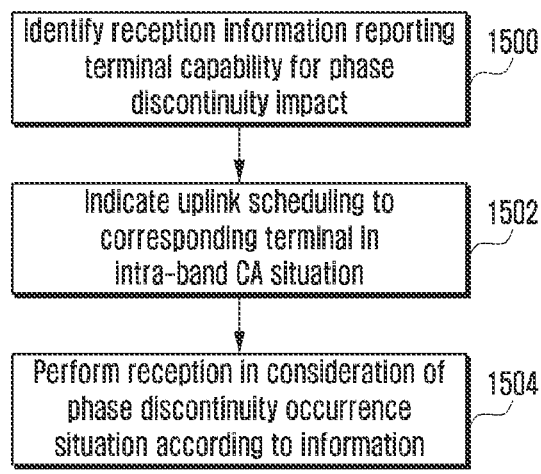
FIG. 15 is a block diagram illustrating a process in which a base station receives uplink information from a terminal that has reported a terminal capability for a phase discontinuity impact.

FIG. 15 is a block diagram illustrating a process in which a base station receives uplink information from a UE that has reported a UE capability for a phase discontinuity impact.

In case that the base station requests the UE to report a UE capability or receives a report on a UE capability from the UE without a separate request, the base station may receive a report on a UE capability for a phase discontinuity impact from the UE (1500).

In case that the base station operates intra-band CA or EN-DC, the base station may transmit information indicating uplink scheduling for transmitting and receiving uplink information for each carrier to the UE (1502).

When the UE transmits uplink information based on the received information, in case that phase discontinuity occurs, the base station may receive uplink information from the UE by at least one of the methods described in FIGS. 10 to 13 or some combination thereof (1504). Alternatively, in case that phase discontinuity does not occur, the base station may receive uplink information in the uplink resource according to scheduling indicated to the UE (1504).

In the disclosure, in order to determine whether a particular condition (or criterion) is fulfilled, the expression of a specific number or more or a specific number or less has been used, but this is only a description for representing an example and does not exclude the description of excess or less than a specific number. A condition described as 'specific number or more' may be replaced by 'excess', a condition described as 'specific number or less' may be replaced by 'less than', and a condition described as 'specific number or more and 'less than' may be replaced by 'excess and specific number or less'.

Methods according to the embodiments described in the claims or specifications of the disclosure may be implemented in the form of hardware, software, or a combination of hardware and software. When implemented in software, a computer readable storage medium storing one or more programs (software modules) may be provided. One or more programs stored in the computer readable storage medium are configured for execution by one or more processors in an electronic device. The one or more programs include instructions for causing an electronic device to execute methods according to embodiments described in the claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), another form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide LAN (WLAN), or storage area Network (SAN), or a communication network configured with a combination thereof. Such a storage device may access a device implementing an embodiment of the disclosure through an external port. Further, a separate storage device on the communication network may access the device implementing the embodiment of the disclosure.

In the above-described specific embodiments of the disclosure, components included in the disclosure have been expressed in the singular or the plural according to the presented specific embodiments. However, the singular or plural expression is appropriately selected for a presented situation for convenience of description, and the disclosure is not limited to the singular or plural components, and even if a component is represented in the plural, it may be configured with the singular, or even if a component is represented in the singular, it may be configured with the plural.

Embodiments of the disclosure disclosed in this specification and drawings merely present specific examples in order to easily describe the technical contents of the disclosure and help the understanding of the disclosure, and they are not intended to limit the scope of the disclosure. That is, it will be apparent to those of ordinary skill in the art to which the disclosure pertains that other modifications based on the technical spirit of the disclosure may be implemented. Further, one or more of Embodiments 1 to 3 may be operated in combination with each other, as needed. For example, the base station and the UE may be operated by combining parts of the methods proposed in the disclosure. Further, although the above embodiments have been presented based on 5G and NR systems, other modifications based on the technical spirit of the embodiments may be implemented in other systems such as LTE, LTE-A, and LTE-A-Pro systems.

The invention claimed is:

1. A method for a terminal supporting carrier aggregation (CA) of a first component carrier (CC) and a second CC in an unlicensed band to transmit an uplink signal, the method comprising:
   reporting, to a base station, a terminal capability for a phase discontinuity impact;
   receiving, from the base station, information for a configured grant PUSCH at the first CC;
   receiving, from the base station, information for a dynamic grant PUSCH at the second CC;
   determining to cancel a transmission of at least part of the configured grant PUSCH,
      wherein the transmission of the at least part of the configured grant PUSCH is cancelled from a time point;
   determining whether to cancel a transmission of at least part of the dynamic grant PUSCH; and
   transmitting, to the base station, the dynamic grant PUSCH,
   wherein the transmission of at least part of the dynamic grant PUSCH is cancelled from the time point in case that the first CC and the second CC are adjacent in frequency domain and the time point is located during transmission of the dynamic grant PUSCH.

2. The method of claim 1, wherein the dynamic grant PUSCH is transmitted without cancellation in case that the time point is located before the transmission start of the dynamic grant PUSCH.

3. The method of claim 1, wherein the time point is determined based on at least one of:
   a first time period before a dynamic PUSCH transmission start at the first CC, in case that the dynamic grant PUSCH is scheduled after the configured grant PUSCH at the first CC;
   a second time period after a last symbol of the PDCCH including a slot format indicator notifying that at least one of resources allocated to the configured grant PUSCH is a downlink symbol, in case that the PDCCH is received before the configured grant PUSCH; or
   a third time period after a last symbol of the PDCCH including DCI indicating scheduling of the dynamic grant PUSCH at the first CC, in case that the dynamic grant PUSCH at the first CC is scheduled after the configured grant PUSCH and the PDCCH including DCI scheduling the dynamic grant PUSCH at the first CC is received before the configured grant PUSCH.

4. The method of claim 1, wherein the a length, a start time point, and an end time point of the transmission interval of the configured grant PUSCH and the dynamic grant PUSCH are the same.

5. The method of claim 1, wherein the terminal reporting the terminal capability for the phase discontinuity impact to the base station is configured to control transmission power equally for the first CC and the second CC.

6. A method for a base station performing carrier aggregation (CA) of a first component carrier (CC) and a second CC in an unlicensed band to receive an uplink signal, the method comprising:
   receiving, from a terminal, a report on a terminal capability for a phase discontinuity impact;
   transmitting, to the terminal, information for a configured grant PUSCH at the first CC;
   transmitting, to the terminal, information for a dynamic grant PUSCH at the second CC; and
   receiving, from the terminal, the dynamic grant PUSCH,
   wherein a transmission of at least part of the configured grant PUSCH is cancelled from a time point, and
   wherein the transmission of at least part of the dynamic grant PUSCH is cancelled from the time point, in case that the first CC and the second CC are adjacent in frequency domain and the time point is located during transmission of the dynamic grant.

7. The method of claim 6, wherein the terminal reporting the terminal capability for the phase discontinuity impact to the base station is configured to control transmission power equally for the first CC and the second CC.

8. A terminal for supporting carrier aggregation (CA) of a first component carrier (CC) and a second CC in an unlicensed band, the terminal comprising:
   a transceiver; and
   a controller configured to control to:
      report, to a base station, a terminal capability for a phase discontinuity impact,
      receive, from the base station, information for a configured grant PUSCH at the first CC;
      receive, from the base station, information for a dynamic grant PUSCH at the second CC;
      determine to cancel a transmission of at least part of the configured grant PUSCH, wherein the transmission of the at least part of the configured grant PUSCH is cancelled from a time point;
      determine whether to cancel a transmission of at least part of the dynamic grant PUSCH;
      transmit, to the base station, the dynamic grant PUSCH,
   wherein the transmission of at least part of the dynamic grant PUSCH is cancelled from the time point, in case that the first CC and the second CC are adjacent in frequency domain and the time point is located during transmission of the dynamic grant PUSCH.

9. The terminal of claim 8, wherein the dynamic grant PUSCH is transmitted without cancellation in case that the time point is located before the transmission start of the dynamic grant PUSCH.

10. The terminal of claim 8, wherein the time point is determined based on at least one of:
- a first time period before a dynamic PUSCH transmission start at the first CC; in case that the dynamic grant PUSCH is scheduled after the configured grant PUSCH at the first CC;
- a second time period after a last symbol of the PDCCH including a slot format indicator notifying that at least one of resources allocated to the configured grant PUSCH is a downlink symbol, in case that the PDCCH is received before the configured grant PUSCH; or
- a third time period after a last symbol of the PDCCH including DCI indicating scheduling of the dynamic grant PUSCH at the first CC, in case that the dynamic grant PUSCH at the first CC is scheduled after the configured grant PUSCH and the PDCCH including DCI scheduling the dynamic grant PUSCH at the first CC is received before the configured grant PUSCH.

11. The terminal of claim 8, wherein a length, a start time point, and an end time point of the transmission interval of the configured grant PUSCH and the dynamic grant PUSCH are the same.

12. The terminal of claim 8, wherein the terminal reporting the terminal capability for the phase discontinuity impact to the base station is configured to control transmission power equally for the first CC and the second CC.

13. A base station for performing carrier aggregation (CA) of a first component carrier (CC) and a second CC in an unlicensed band, the base station comprising:
- a transceiver; and
- a controller configured to control to:
  - receive a report on a terminal capability for a phase discontinuity impact from a terminal,
  - transmit, to the terminal, information for a configured grant PUSCH at the first CC;
  - transmit, to the terminal, information for a dynamic grant PUSCH at the second CC;
  - receive, from the terminal, the dynamic grant PUSCH,
  - wherein a transmission of at least part of the configured grant PUSCH is cancelled from a time point, and
  - wherein the transmission of at least part of the dynamic grant PUSCH is cancelled from the time point, in case that the first CC and the second CC are adjacent in frequency domain and the time point is located during transmission of the dynamic grant PUSCH.

14. The base station of claim 13, wherein the terminal reporting the terminal capability for the phase discontinuity impact to the base station is configured to control transmission power equally for the first CC and the second CC.

* * * * *